(12) United States Patent
Takeda et al.

(10) Patent No.: US 6,198,566 B1
(45) Date of Patent: Mar. 6, 2001

(54) OPTICAL SWITCHING DEVICE, PICTURE DISPLAY AND PROJECTION APPARATUS

(75) Inventors: Takashi Takeda, Suwa; Masatoshi Yonekubo, Nagano-ken, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/381,529

(22) PCT Filed: Oct. 7, 1998

(86) PCT No.: PCT/JP98/04543

§ 371 Date: Dec. 20, 1999

§ 102(e) Date: Dec. 20, 1999

(87) PCT Pub. No.: WO99/36823

PCT Pub. Date: Jul. 22, 1999

(30) Foreign Application Priority Data

Jan. 20, 1998 (JP) .................................. 10/009149
Feb. 2, 1998 (JP) .................................. 10/021299

(51) Int. Cl.[7] ........................................ G02F 1/03
(52) U.S. Cl. ................................ 359/254; 359/252
(58) Field of Search ........................ 359/245, 252, 359/254, 619, 267, 272, 630

(56) References Cited

U.S. PATENT DOCUMENTS 6,069,728 * 5/2000 Huignard et al. .................... 359/245

FOREIGN PATENT DOCUMENTS 10-78549   3/1998   (JP) .

* cited by examiner

*Primary Examiner*—Hung Xuan Dang
(74) *Attorney, Agent, or Firm*—Mark P. Watson

(57) ABSTRACT

A picture display device in accordance with the present invention is provided with a light guiding member equipped with a total reflection surface capable of transmitting an incoming light ray for image display by means of total reflection, and an optical switching member having a micro prism that extracts evanescent light leaking out of the total reflection surface and reflects it to a display area of the total reflection surface. The incoming light ray is applied to the display area from two symmetric directions so as to obtain outgoing light rays from all surfaces of the micro prism. Hence, a picture display device featuring still higher brightness and higher contrast can be attained. Furthermore, an apex angle of the micro prism, etc. are optimized thereby to provide further uniform outgoing light arranged perpendicularly with respect to the total reflection surface, thus realizing a picture display device capable of displaying high-quality images.

30 Claims, 12 Drawing Sheets

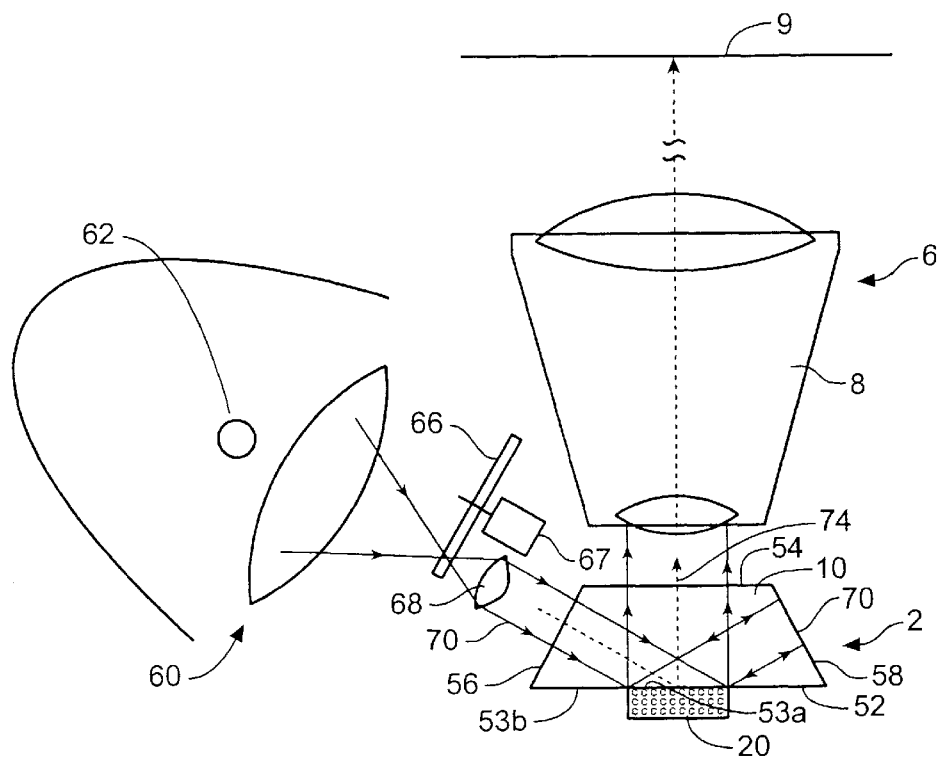
FIG._1
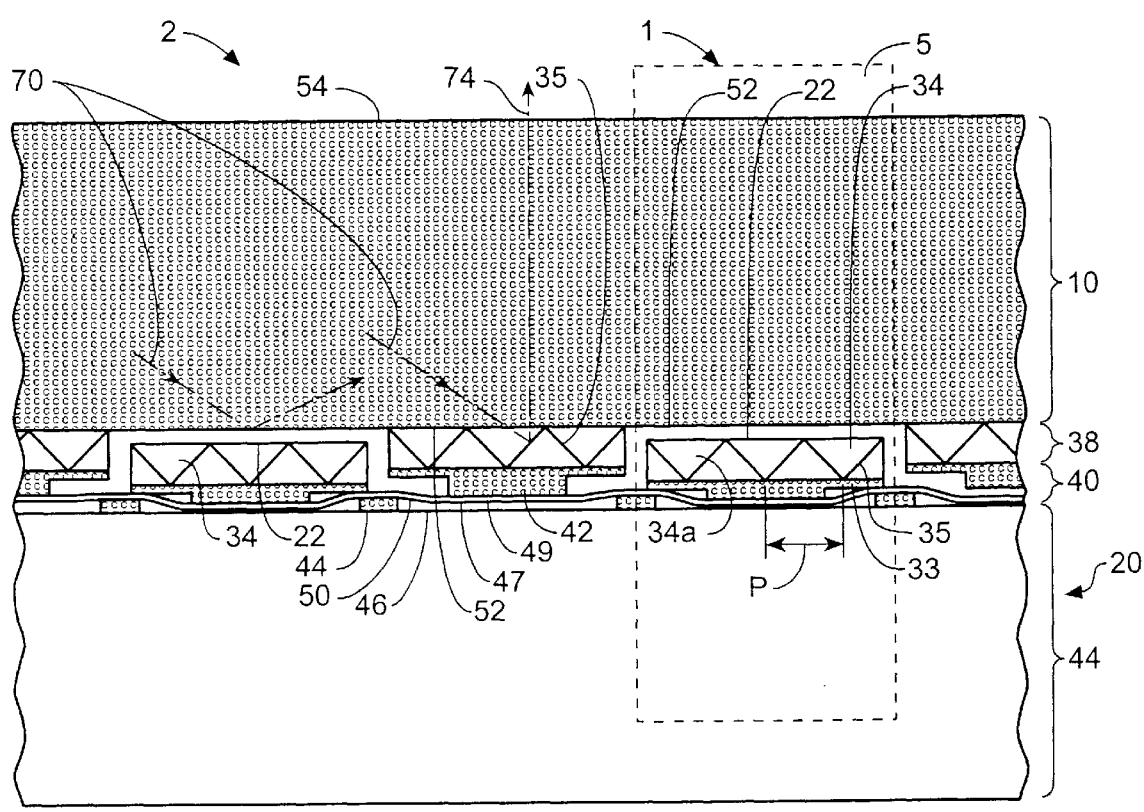
FIG._2

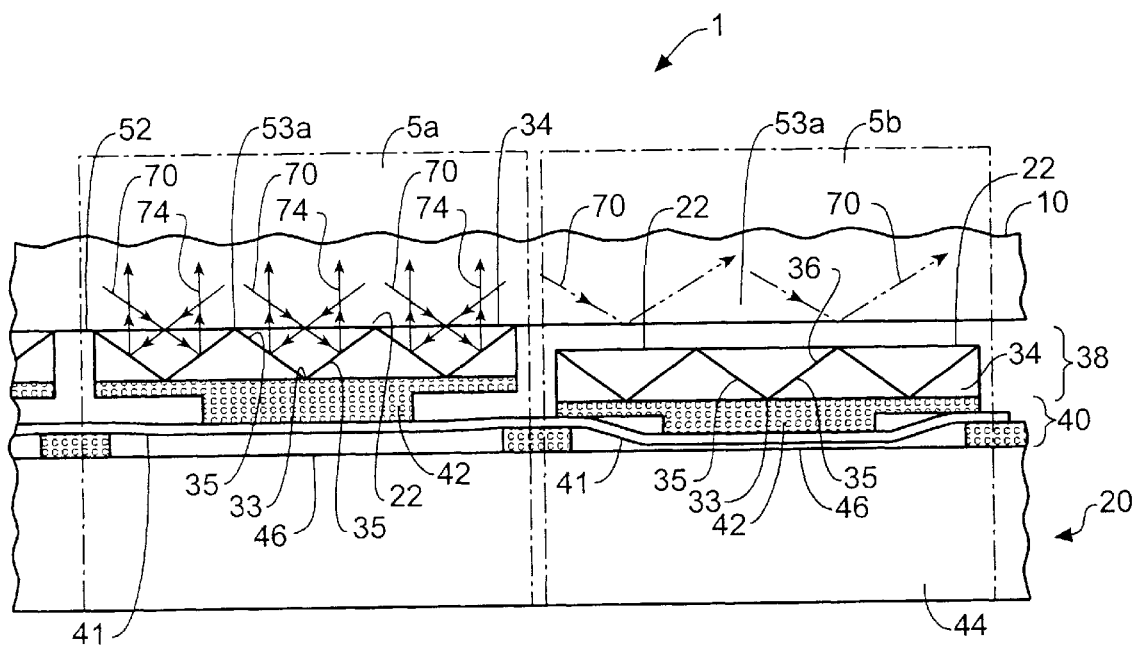
FIG._3
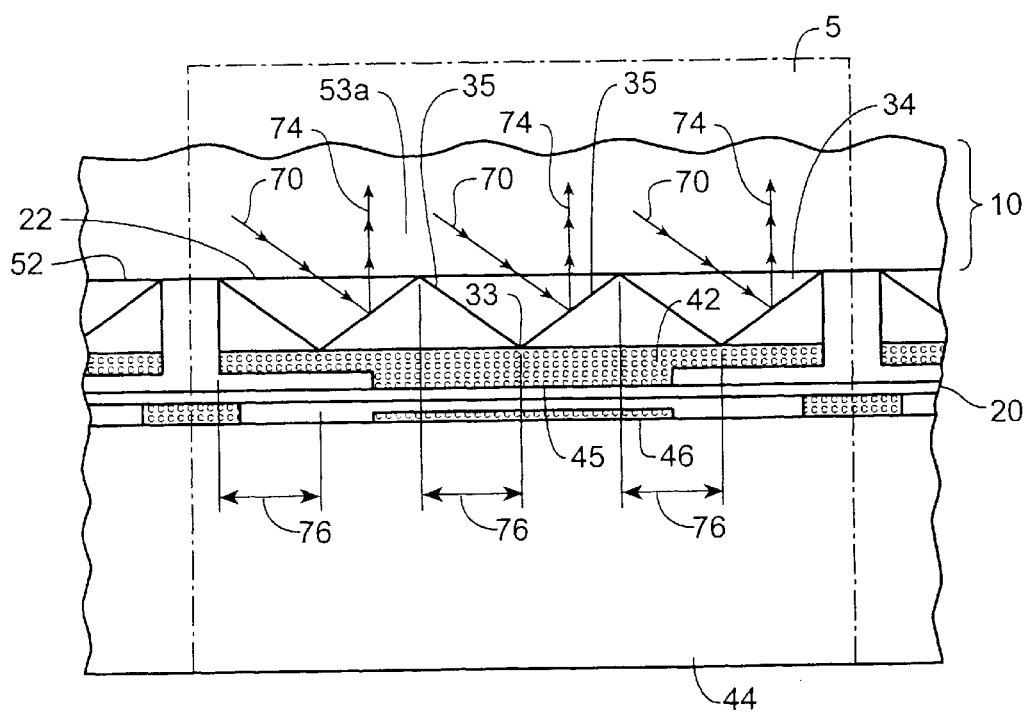
FIG._4

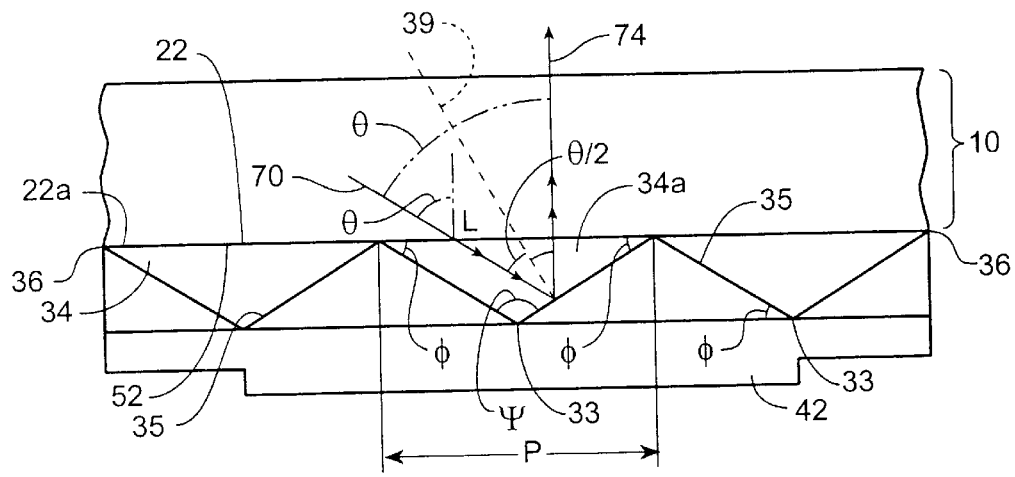
FIG._5
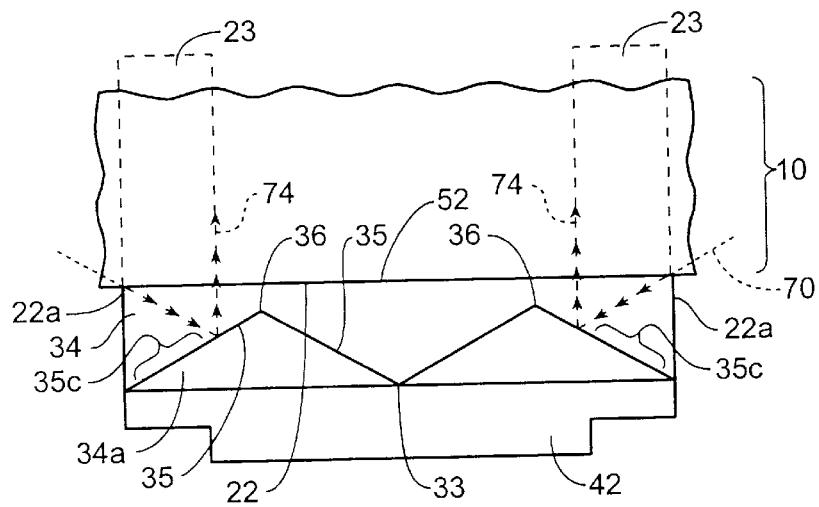
FIG._7
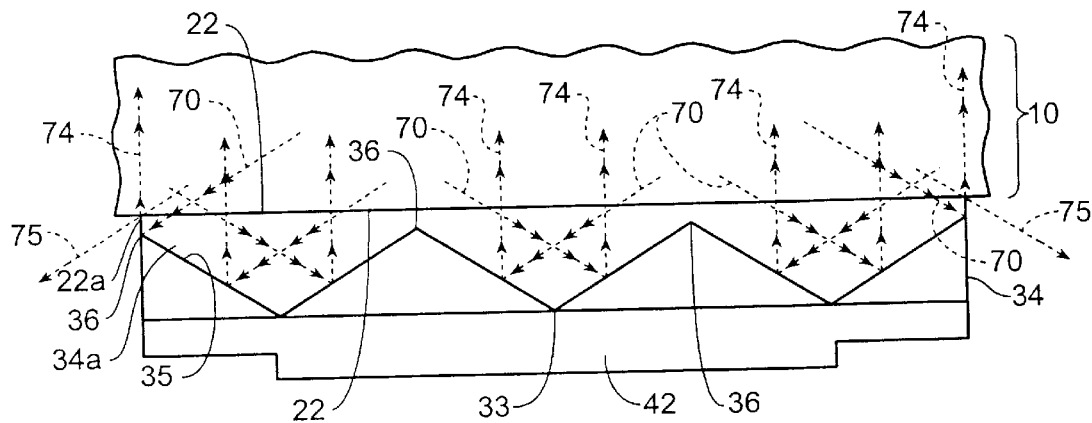
FIG._8

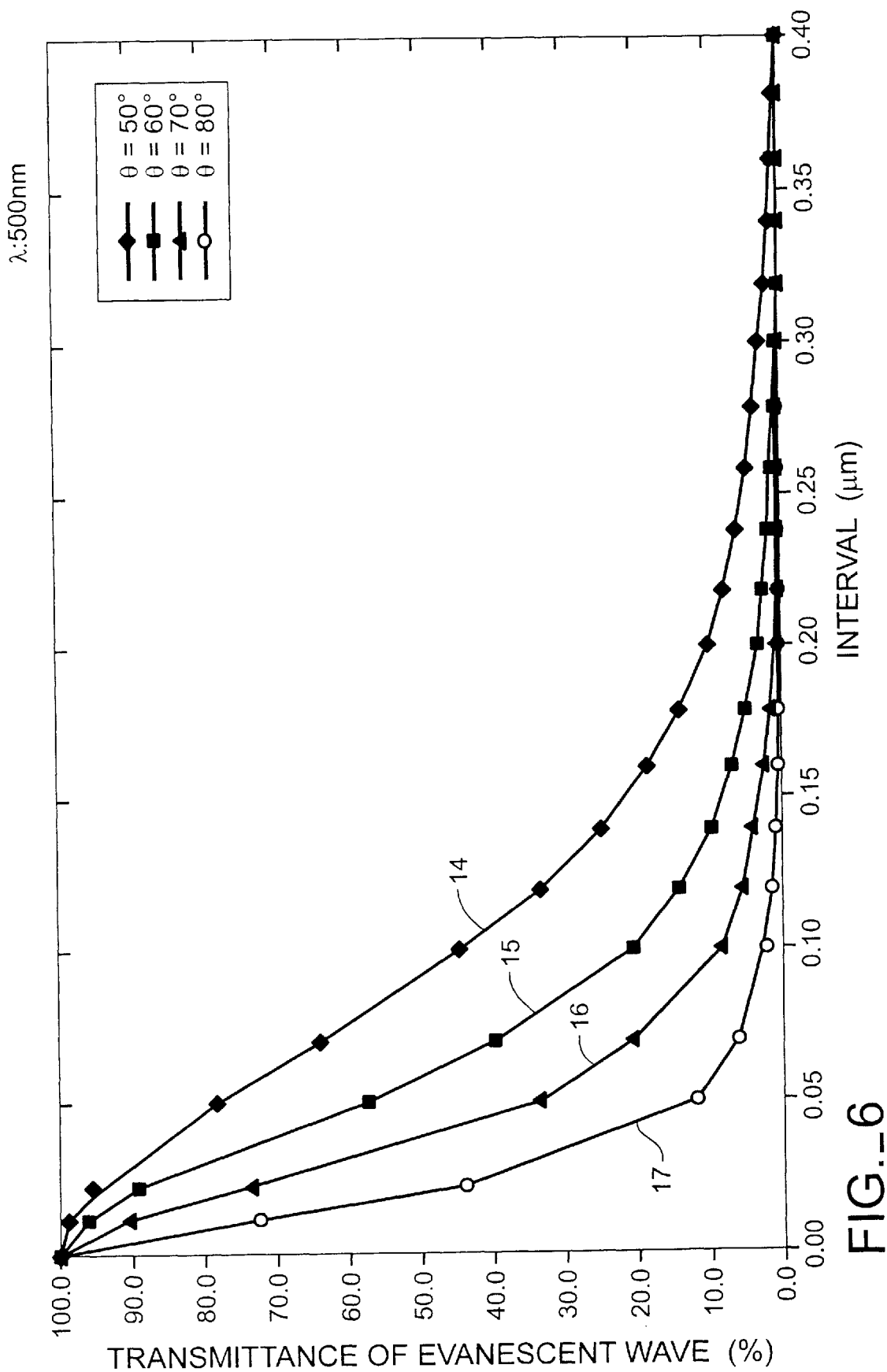
FIG._6

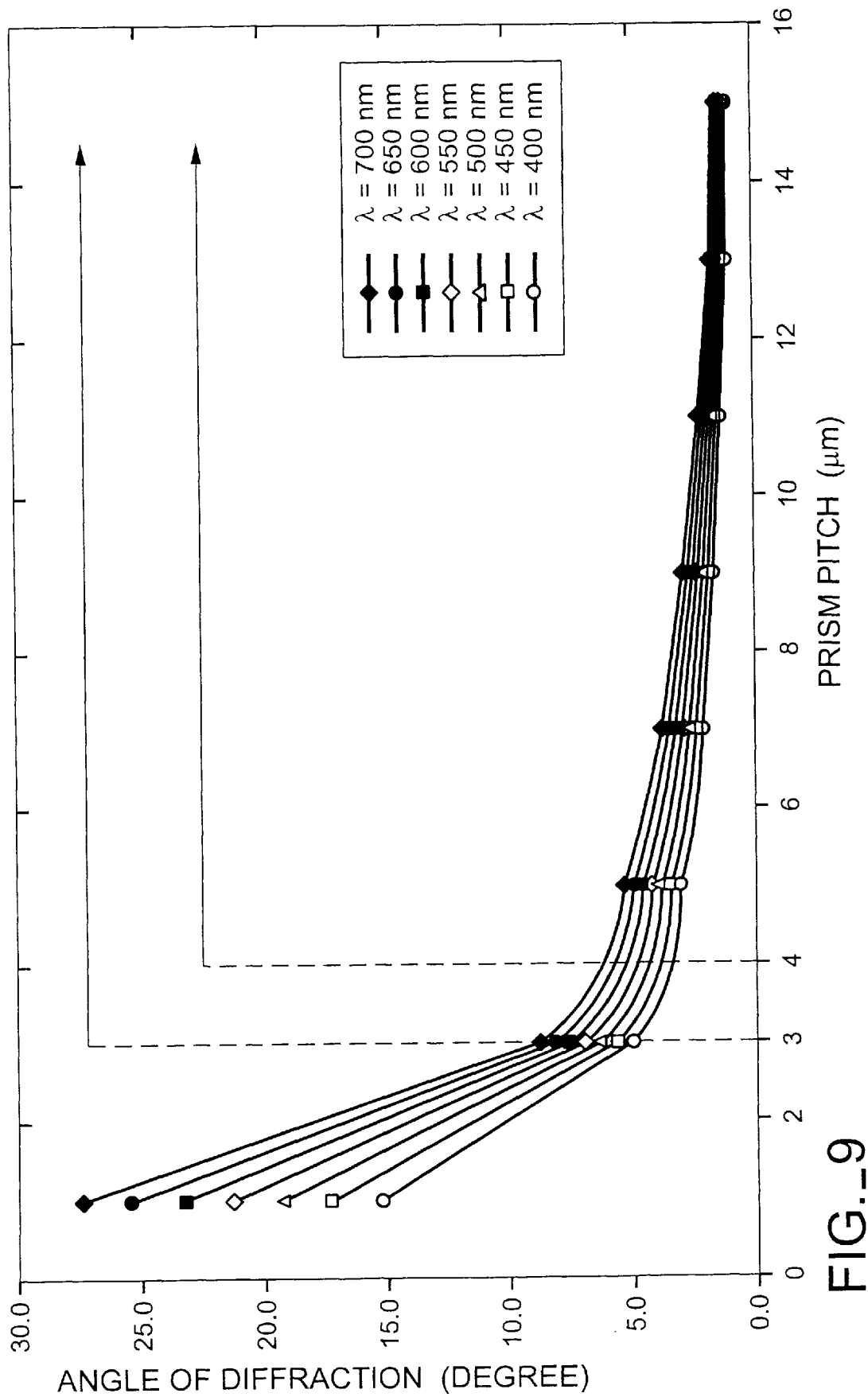
FIG._9

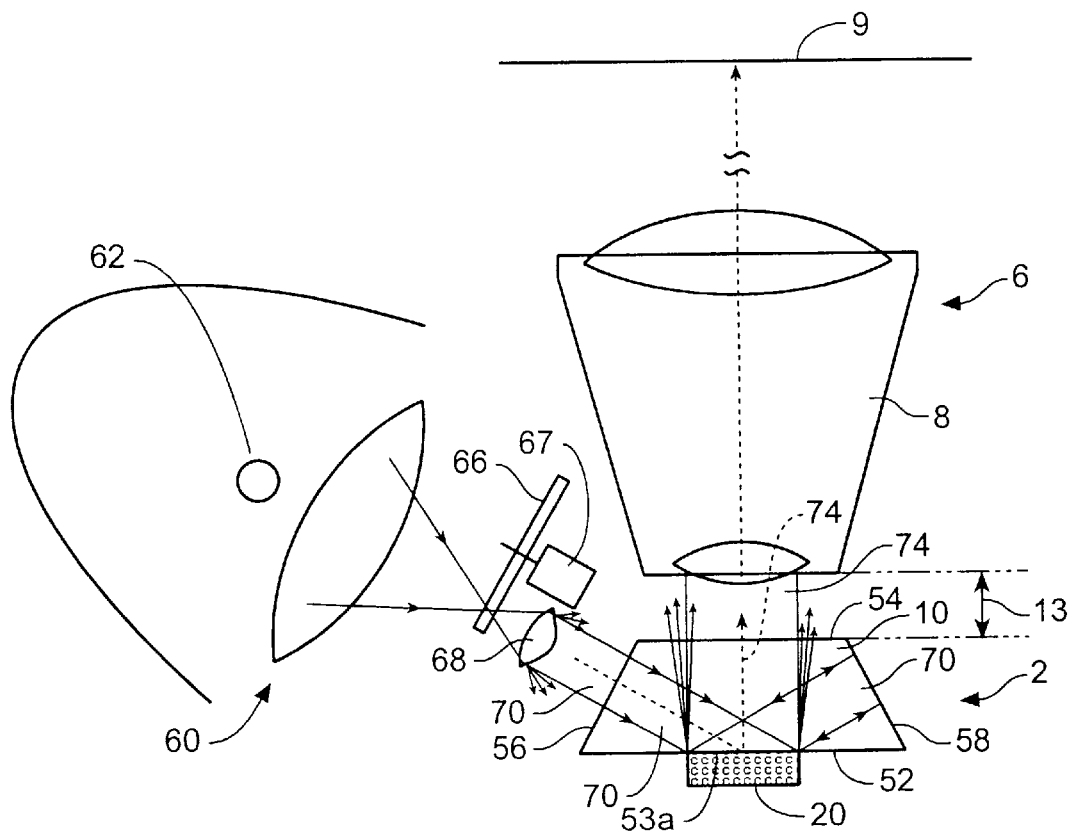
FIG._10
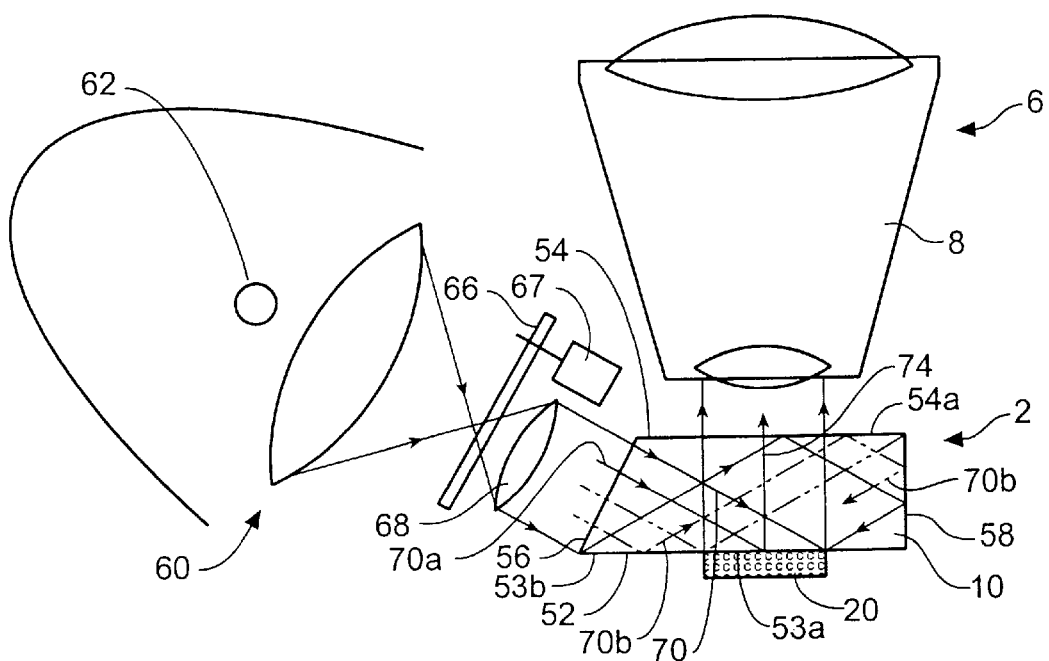
FIG._11

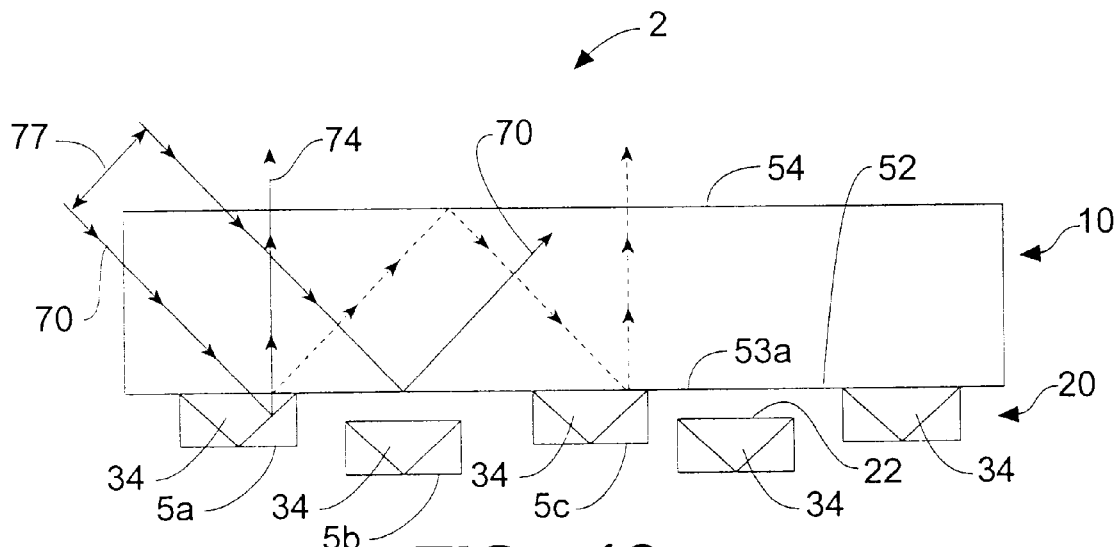
FIG._12a
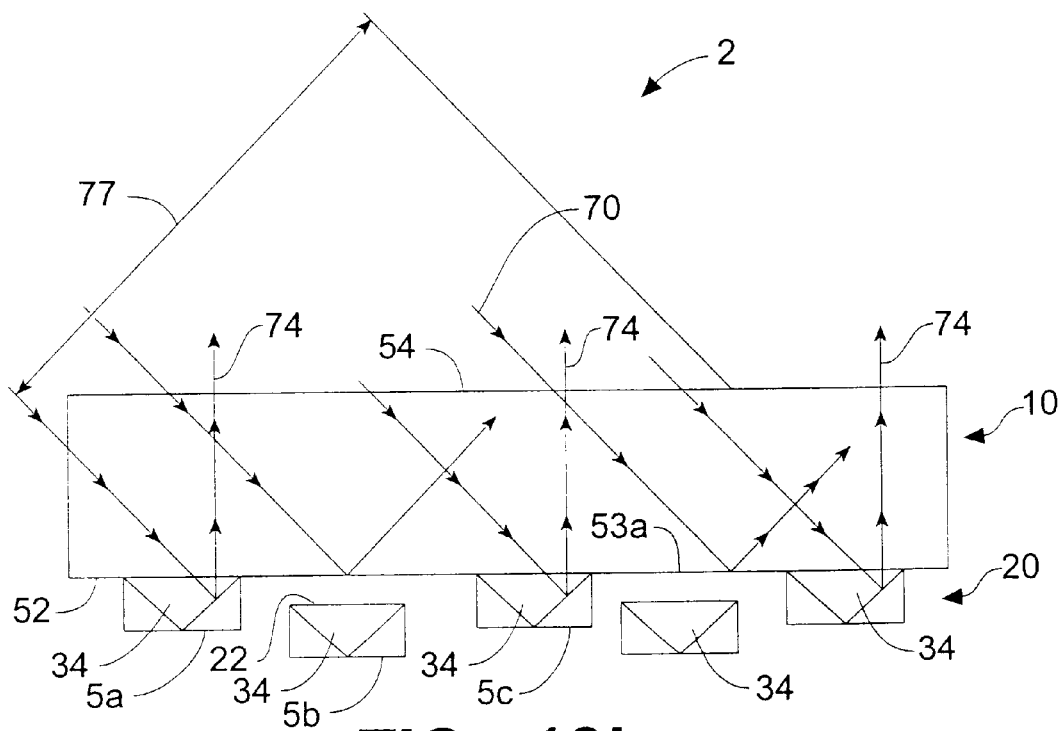
FIG._12b

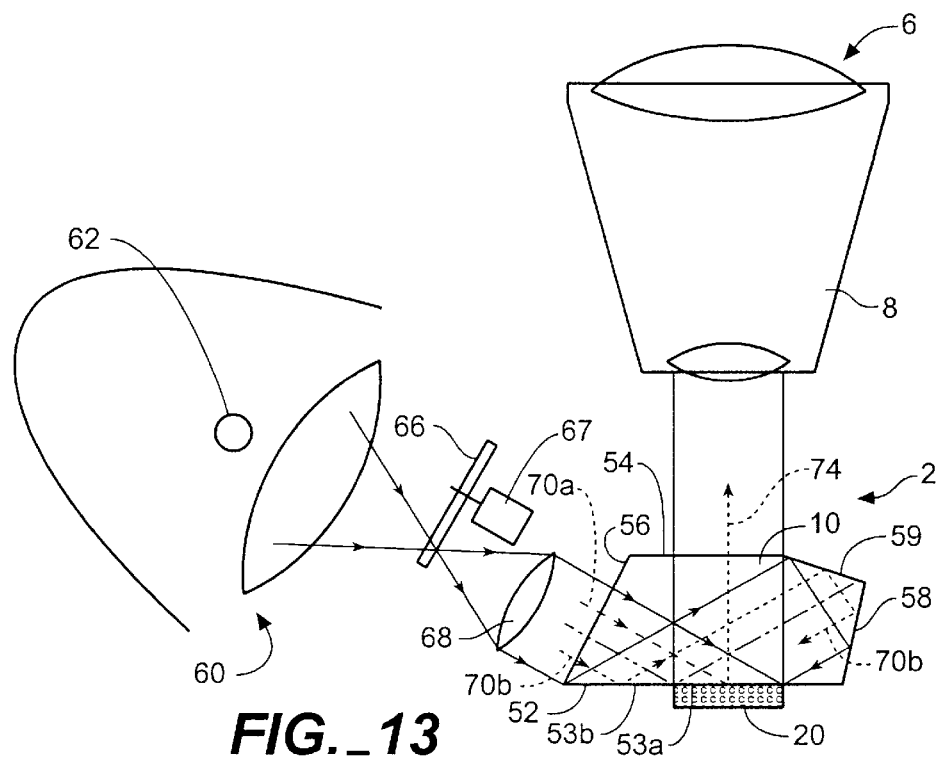
FIG._13
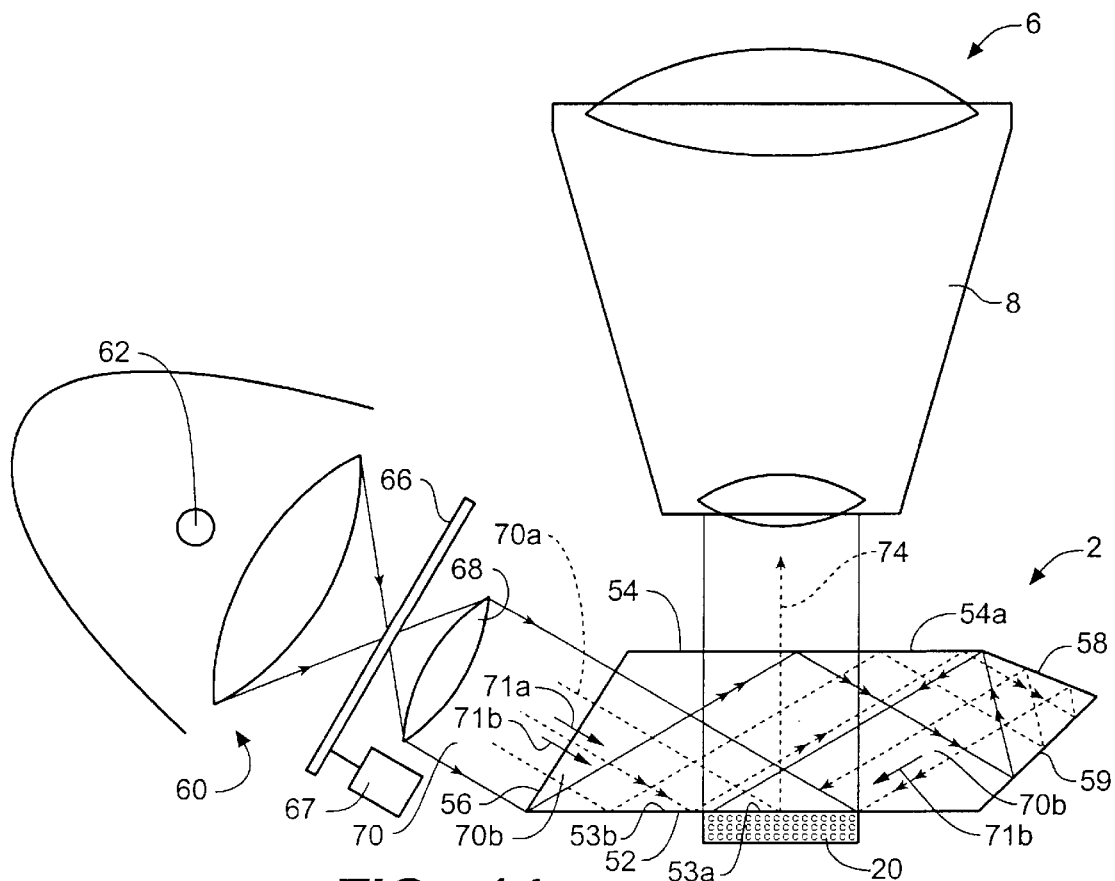
FIG._14

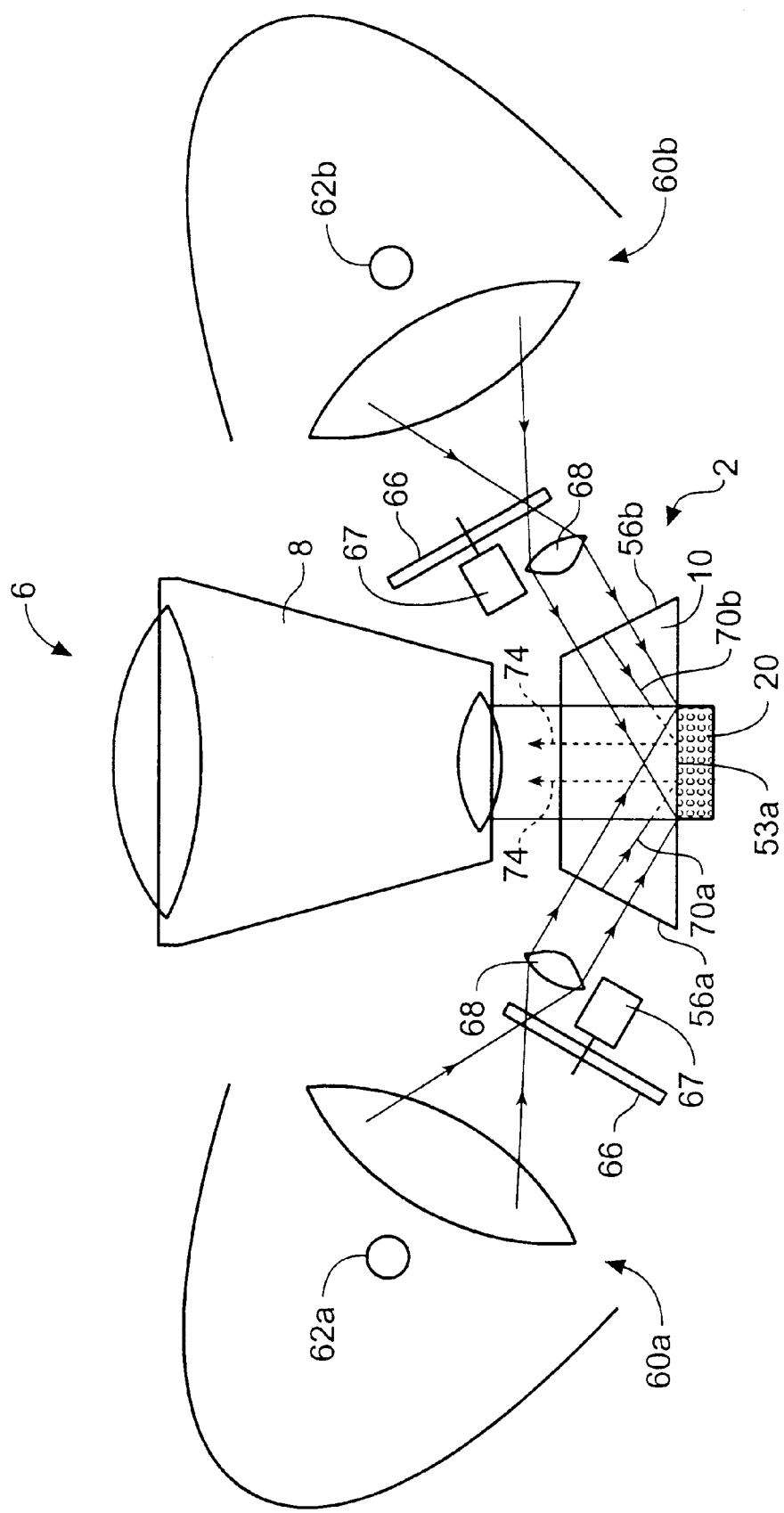
FIG._15

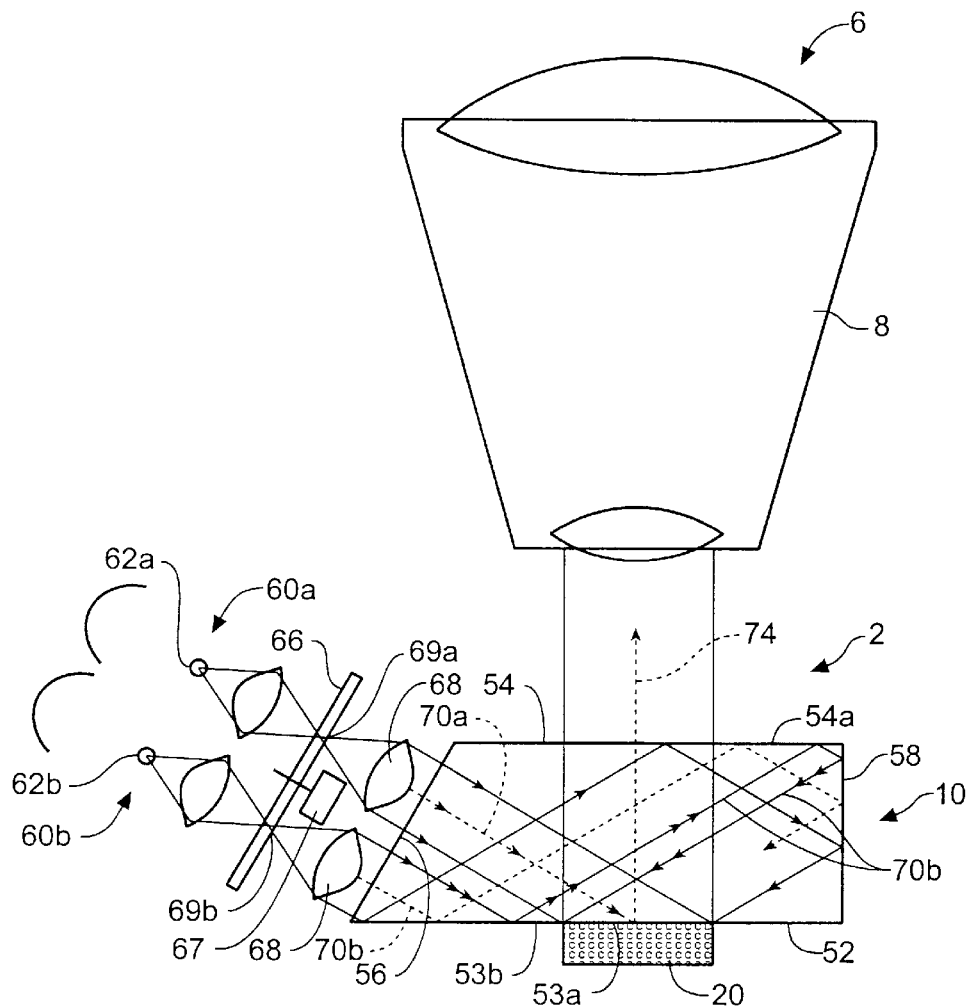
FIG._16
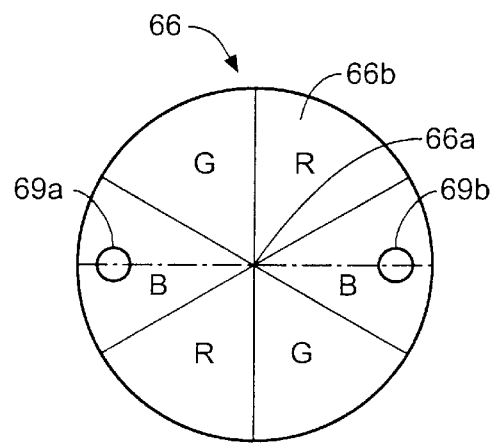
FIG._17

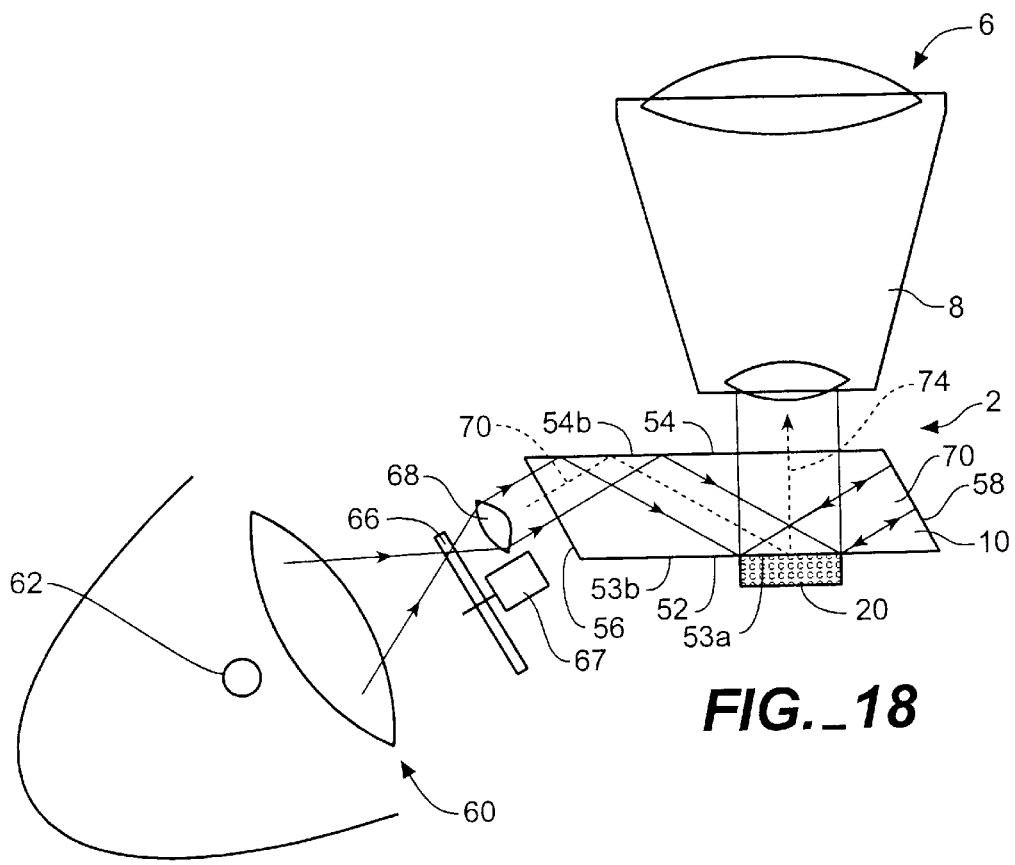
FIG._18
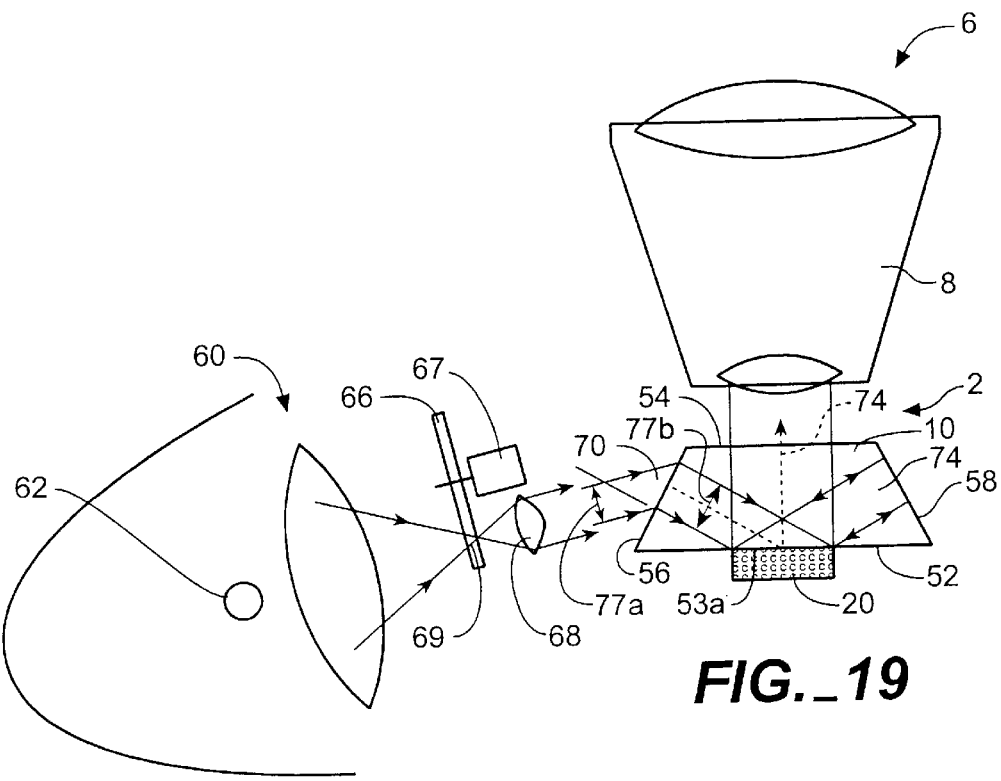
FIG._19

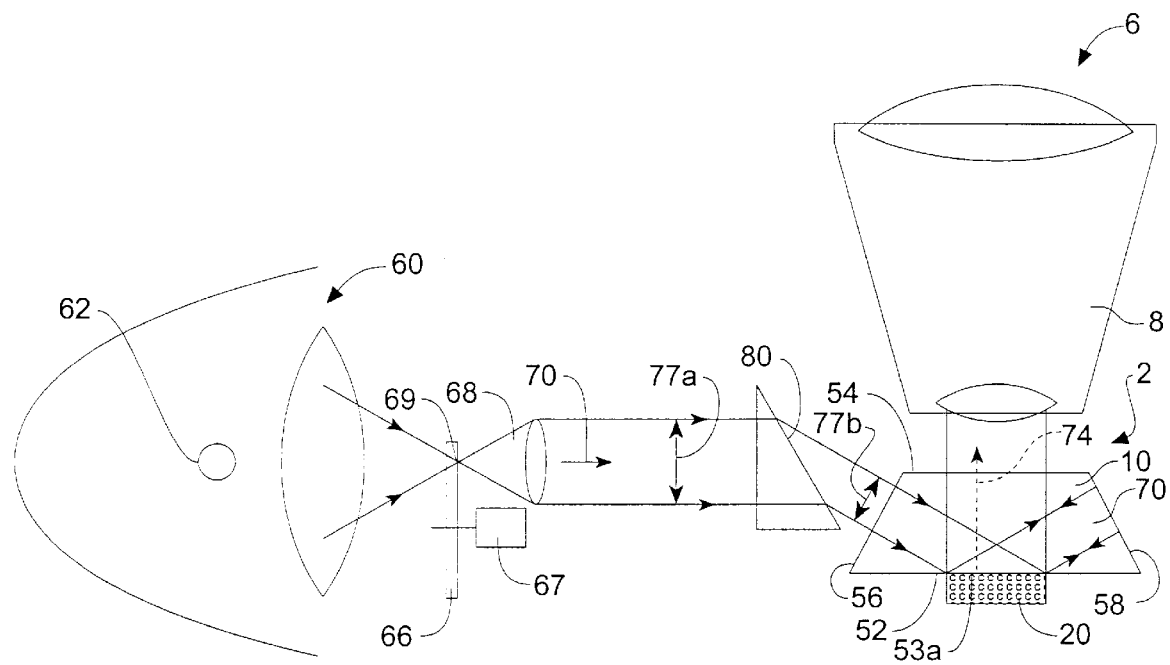
FIG._20
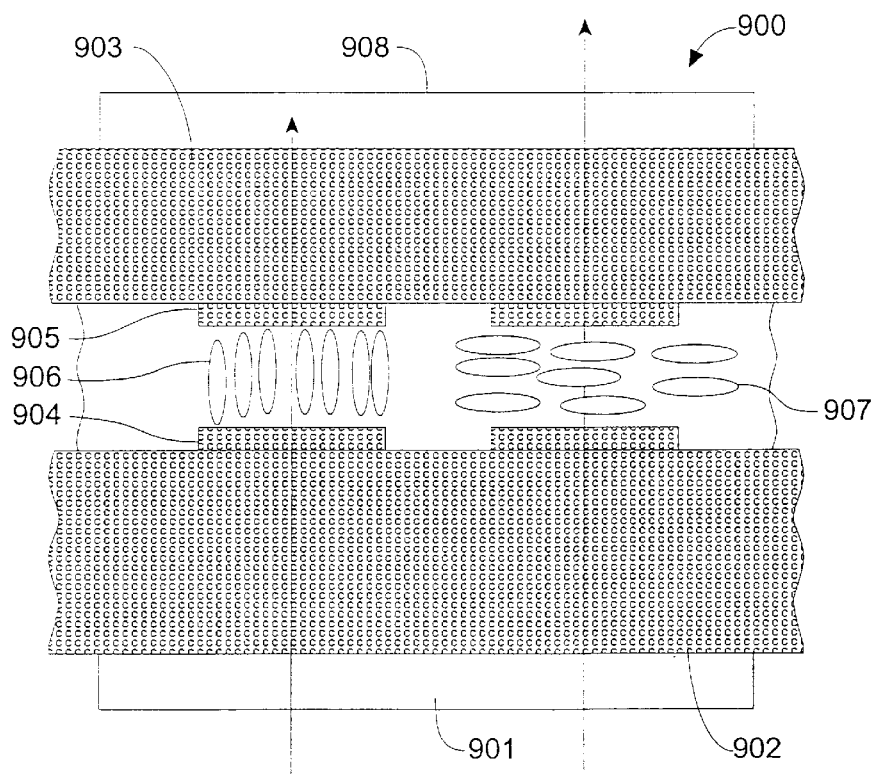
FIG._21

OPTICAL SWITCHING DEVICE, PICTURE DISPLAY AND PROJECTION APPARATUS

BACKGROUND OF THE INVENTION

1. Technical Field

The present invention relates to an optical switching device (light valve) used for optical communication, optical operation, an optical storage, an optical printer, a picture display device, etc. and, more particularly, to a picture display device and an optical switching device applicable to a projection apparatus or the like.

2. Background Art

A picture display device such as a projector primarily employs a liquid crystal display device 900 that uses liquid crystal as an optical switching device as shown in FIG. 21 which provides a schematic configuration thereof. The liquid crystal display device 900 formed of a polarizers 901 and 908, glass plates 902 and 903, transparent electrodes 904 and 905, and liquid crystals 906 and 907 provides pixel display by applying a voltage between the transparent electrodes to change the orientations of liquid crystal molecules thereby to rotate polarizing surfaces. Images are presented by using a liquid crystal panel constituted by pixels which are formed of such optical switching devices (liquid crystal cells) and are two-dimensionally arranged, and by adjusting an applied voltage to control the orientations of liquid crystal molecules so as to perform gray-scale representation.

Liquid crystal, however, exhibits poor fast-response characteristic and operates at a response speed of only about a few milliseconds at most. There has been another problem in that the polarizers deteriorate light utilization efficiency of liquid crystal, and an attempt to obtain a higher contrast ratio considerably adds to power consumed. For this reason, as a picture display device that is required to provide still higher picture quality, there have recently been demands for a picture display device capable of providing brighter display with more accurate gray scale representation than a liquid crystal display apparatus.

In recent years, a picture display device has been under study that employs an optical switching device capable of quickly turning light ON/OFF by bringing an optical switching assembly, which is equipped with a light transmitting micro prism capable of extracting light, close to a light guiding member that is capable of transmitting light by means of total reflection so as to extract evanescent light (evanescent wave) and by a minute movement of about one wavelength or less. The picture display device employing such an optical switching assembly is expected to be able to provide brighter picture display with higher contrast since the picture display device is capable of operating at faster speed because of a shorter moving distance and also capable of enhancing light utilization efficiency. However, the picture display device utilizing evanescent light is still in a developing phase, and it has not yet necessarily become able to provide higher efficiency of light utilization and high-quality images with higher contrast.

Accordingly, an object of the present invention is to provide a picture display device capable of enhancing the efficiency of light utilization so as to provide higher quality pictures with higher contrast by optimizing a picture display device employing an optical switching device utilizing evanescent light, particularly by optimizing a path or the like of an incoming light ray applied to a display area provided on a total reflection surface. Another object of the invention is to provide an optical switching device ideally suited for such a picture display device.

DISCLOSURE OF THE INVENTION

To these ends, a picture display device in accordance with the present invention employs a micro prism to extract and reflect an evanescent wave, and is designed so that light is applied to the micro prism from two symmetric directions. Therefore, the picture display device in accordance with the present invention has a light guiding member equipped with a total reflection surface capable of transmitting an incoming light ray for image display by means of total reflection, an optical switching assembly attached to a display area of the total reflection surface, and a light source assembly capable of applying an incoming light ray to at least the display area, wherein the optical switching assembly is equipped with a plurality of light transmitting extracting surfaces that can be moved to a first position where they are close to an extracting distance or less at which evanescent waves (evanescent light) leaking from the display area can be extracted, and a second position where they are away from the extracting distance or farther, and a plurality of micro prisms that reflect the light extracted from the extracting surfaces toward the light guiding member; and the light source assembly or the light guiding member are arranged so that an incoming light ray can be applied from two directions that are symmetrical in relation to the display area. Furthermore, an arrangement is made so that an incoming light ray is applied to the micro prisms of the optical switching assembly from both sides so as to increase the intensity of an outgoing light ray per pixel. Thus, brighter images can be obtained, and ON/OFF contrast can also be increased.

In order to extract evanescent light leaking from an incoming light ray that is totally reflected on the total reflection surface and to emit it as a vertical outgoing light ray, a triangular micro prism that has an appropriate apex angle and extends along the total reflection surface is suitably used. By radiating an incoming light ray from two symmetric directions to the micro prism, the incoming light ray can be reflected by two prism surfaces having different angles with the apex being located therebetween. This makes it possible to obtain an outgoing light ray that is approximately twice as intense as that obtained when an incoming light ray is applied from one direction. Moreover, the outgoing light ray is emitted from the entire micro prism constituting one pixel, permitting a seamless image with no gap between pixels to be obtained. Hence, the present invention makes it possible to provide a picture display device capable of displaying brighter, higher-quality images by using evanescent light.

Preferably, the light source assembly or the light guiding member is configured so that the entire display area is irradiated by an incoming light ray that is not reflected in the display area. If the light source assembly or the light guiding member is configured so that an incoming light ray that has been reflected by a part of the display area is applied to another display area, then the intensity of the incoming light ray radiating another display area changes depending on whether the optical switching assembly of the display area to which the incoming light ray is applied first is ON or OFF. Hence, there is a likelihood that the light intensity of an outgoing light ray for displaying an image changes according to a display area or an image mode, or the intensity of an incoming light ray becomes insufficient in another display area, and an outgoing light ray produced by ON/OFF of the switching assembly may not be obtained with a resultant failure to display an image. To avoid this problem, the entire display area is radiated by an incoming light ray that has not been reflected in the display area. This enables an incoming light ray of a constant intensity to be applied to all switching assemblies of the display area regardless of operating states of other switching assemblies. Hence, deterioration of image quality such as a chipped image or a reduced contrast can be prevented.

An incoming light ray can be applied to a display area from two directions by installing a light source assembly on one side of the light introducing assembly and by installing a reflecting surface on a side opposing an incident surface through which light from the light source assembly enters the light guiding member, with the total reflection surface being located therebetween. As the reflection surface, one that utilizes total reflection to reflect an incoming light ray to a display area, or one that has a reflective film, which is formed by vapor deposition or the like, to reflect the incoming light ray to the display area may be used. Furthermore, it is also possible to use a plurality of reflecting surfaces to eventually lead an incoming light ray incident from the light source assembly to a reflecting surface on which the incoming light ray is reflected at an appropriate angle with respect to the display area. At this time, it is desirable that the incoming light ray is reflected in an area other than the display area as mentioned above.

Furthermore, if the incoming light ray is emitted from one light source center, then it is preferable that the incoming light ray is applied to the display area so that the incoming light flux emitted from the light source center is halved substantially at the center thereof, and one split incoming light flux is reflected in an area other than the display area of the total reflection surface. It is also preferable that the reflecting surface causes the distribution of light quantity to be reversed with respect to the other split incoming light flux. From the light source assembly, an incoming light ray is applied that has intensity distribution wherein the intensity is the highest at the center of the light source and the intensity decreases toward a periphery away from the center. Therefore, by applying a half of the incoming light flux to the display area so that the intensity distribution is reversed on the reflecting surface, the distribution of the incoming light ray applied to the display area can be leveled. This makes it possible to provide a picture display device capable of displaying uniformly bright and clear images with a nearly constant light intensity without using a special expensive optical system such as an integrator.

It is alternatively possible to provide two light sources on one side of the light guiding member. Increasing the number of light sources enables electric power load (capacity) per light source to be reduced, so that the amount of heat generated by light sources can be reduced. Hence, the need for a mechanism for cooling light sources can be obviated. If a light source assembly is equipped with two light source centers, then it is required to accomplish synchronization of the colors of incoming light rays coming from the respective light sources to perform color display. The synchronization can be easily accomplished by time-sharing the incoming light rays from the two light source centers by means of a color separation filter assembly in which filters of the same color are point-symmetrically disposed in an area divided using a rotational center as the splitting center.

Furthermore, instead of introducing an incoming light ray to the light guiding member from one side with respect to the total reflection surface, it is obviously possible to provide first and second incident surfaces to which an incoming light ray can be applied from two directions symmetric with respect to the display area in order to apply the incoming light ray to the light guiding member from the two directions. A light ray emitted from a single light source could be split, then guided to first and second incident surfaces along appropriate optical paths; however, it is preferable to provide two light source assemblies at positions opposing the respective incident surfaces. This will make it possible to provide a picture display device capable of omitting complicated optical paths and of controlling attenuation of an incoming light ray in optical paths so as to permit brighter images at lower power consumption.

Furthermore, a light source assembly can be disposed behind an emergent surface by disposing the light source assembly and the incident surface so that an incoming light ray that has entered the incident surface is totally reflected at the emergent surface, then applied to the display area. Therefore, when a projection lens is disposed on the side of the emergent surface of the picture display device to provide a projection apparatus, the projection lens and the light source assembly can be disposed without a problem of interference.

Furthermore, the interference between the light source assembly and the projection lens can be prevented as mentioned above by making an arrangement so that an incoming light ray from the light source assembly is refracted at the incident surface to change its angle before the incoming light ray is applied to the display area. Moreover, the configuration of the section of an incoming light flux can be changed by refracting the incoming light ray at the incident surface. It is also possible to control an incoming light ray by the angle at the incident surface so that the entire display area can be irradiated at an appropriate intensity. In addition, the same advantages as mentioned above can be obtained also by installing an incident prism, which leads an incoming light ray to the incident surface at an appropriate angle formed between the incident surface and the light source assembly, separately from the introducing assembly.

Preferably, a micro prism constituting the optical switching assembly of the picture display device reflects an incoming light ray as perpendicularly as possible in order to display a bright image with a higher contrast. For this reason, it is desirable that an apex angle $\psi$ of the micro prism satisfies an expression (A) shown below with respect to an incident angle $\theta$ of an incoming light ray with respect to the total reflection surface:

$$\psi = 180 \text{ degrees} - \theta \tag{A}$$

Using a prism having an apex angle $\psi$ that satisfies the above expression (A) causes a light ray that has entered an extracting surface, which opposes the apex angle, at an angle $\theta$ to be reflected perpendicularly to the extracting surface. Accordingly, by employing an optical switching assembly equipped with the prism having the apex angle that satisfies the above expression (A), the extracting surface will be at the first position, and a light ray emitted from the light guiding member at the time of ON will be oriented perpendicularly to the total reflection surface. The emergent surface that opposes the total reflection surface of the light guiding member is also parallel to the total reflection surface so as to totally reflect the incoming light ray, and a light ray emitted from the light guiding member becomes perpendicular to the emergent surface. Thus, a picture display device can be provided in which light is not refracted at the emergent surface of the light guiding member, light density is high, and an outgoing light ray with minimized loss at the light guiding member is obtained. Moreover, since images are formed by light emitted perpendicularly to the total reflection surface and the emergent surface of the light guiding member, projection images will be free of distortion, thus enabling images of higher quality to be achieved.

Furthermore, in the picture display device, the optical switching device making up one pixel is formed of a light guiding member, an extracting surface, and a micro prism. Making apex angle ψ of the micro prism satisfy the above expression (A) permits an optical switching device to be provided that is capable of emitting a light ray oriented perpendicularly to the total reflection surface.

Incident angle θ of an incoming light ray in relation to the total reflection surface preferably ranges from about 60 degrees to 70 degrees. If an incoming light ray enters the extracting surface at an incident angle that is smaller than 60 degrees, being closer to 50 degrees, then the distance over which the optical switching assembly is moved to engage an OFF state for preventing evanescent light from leaking increases; therefore, more driving force will be required. For instance, if electrostatic force is used, a driving voltage will be increased, resulting in an increase in power consumption. In addition, since the moving distance increases, the driving speed of the optical switching device drops. Conversely, if the incoming light ray enters the extracting surface at an incident angle that is larger than 70 degrees, being closer to 80 degrees, then an ON state wherein evanescent light leaks will become extremely shorter. As a result, contrast will significantly varies, depending on the surface roughness of the total reflection surface or the extracting surface, or the accuracy of a drive system. Thus, it is difficult to maintain homogeneous gray scale property.

It is particularly preferable that incident angle θ is 60 degrees within the foregoing range. To reflect an incoming light ray that has entered at incident angle θ of 60 degrees in a perpendicular direction, apex angle ψ of the micro prism will be 120 degrees. The reflection surface of the micro prism will be parallel to incoming light. This makes it possible to prevent light that has been extracted by the micro prism from being reflected at a surface different from the surface of the prism that reflects the light in the perpendicular direction, or to prevent any surface, to which the extracted light is not applied, from being produced. Thus, bright outgoing light rays oriented perpendicularly to the total reflection surface can be obtained. Hence, an optical switching device and a picture display device can be provided that are capable of efficiently reflecting incoming light rays by means of the micro prisms, and providing bright light free of loss and a still higher contrast.

If the apex protruding toward the light guiding member is disposed on the inner side from an end of the extracting surface, that is, closer to the center of the micro prism, then the micro prism will have an area to which the light extracted at the extracting surface is not applied. This leads to a reduced quantity of light reflected by the micro prism. Furthermore, if a picture display device is constituted using such micro prism, pixels will be smaller with resultant gaps between the pixels. Hence, it is preferable to dispose the apex of the micro prism that protrudes toward the light guiding member at the end of the extracting surface where incoming light rays enter. This allows an optical switching device with higher brightness and higher contrast to be obtained. Furthermore, such a micro prism is able to eliminate the gaps between pixels, making it possible to provide a picture display device capable of seamless images free of inter-pixel boundaries.

Moreover, it is preferable to position the apex of the micro prism in the vicinity of the extracting surface in order to reflect an incoming light ray, which has been extracted at the extracting surface, without loss. More specifically, by providing the apex of the micro prism at a position near the extracting surface, a light ray entered at an angle within a certain range can be reflected and output without leakage. Thus, an optical switching device and a picture display device featuring high light outgoing efficiency and a large quantity of light.

In addition, the angle of diffraction of outgoing light changes according to a micro prism pitch; therefore, in order to enable an image to be formed by capturing first-order diffracted light having high intensity into a projection lens, it is preferable that the pitch of the micro prism be 3 μm or more. It is more preferable that the pitch of the micro prism be approximately 4 μm or more.

An outgoing light ray emitted from the picture display device in accordance with the present invention may be projected onto a screen through a projection lens to provide a projection apparatus. By decreasing the F number of the projection lens, an outgoing light ray perpendicularly emitted with a relatively small distance provided between the light guiding member and the projection lens and diffracted light with high intensity can be converged, permitting the entire projection apparatus to be compact. Thus, the present invention makes it possible to provide a picture display device and a projection apparatus capable of displaying bright, high-quality images.

BRIEF DESCRIPTION OF THE DRAWINGS

FIG. 1 is a diagram showing a schematic configuration of a picture display device in accordance with an embodiment of the present invention.

FIG. 2 is an enlarged sectional view of an optical switching assembly of the picture display device shown in FIG. 1.

FIG. 3 is an enlarged view of an optical switching device constituting one pixel of the picture display device shown in FIG. 2.

FIG. 4 is a diagram schematically showing a dark portion generated in a pixel in the picture display device shown in FIG. 2.

FIG. 5 is a diagram showing a further enlarged view of a micro prism of the optical switching assembly shown in FIG. 2.

FIG. 6 is a graph showing the transmittance of evanescent light in relation to distance.

FIG. 7 is a diagram illustrating positional effects of the apex of the micro prism unit shown in FIG. 5 with respect to an end of an extracting surface.

FIG. 8 is a diagram illustrating effects of the distance of the apex of the micro prism unit shown in FIG. 5 from the extracting surface.

FIG. 9 is a graph showing a relationship between a prism pitch p and the angle of diffraction.

FIG. 10 is a diagram schematically showing irradiation light condensed by a projection lens having a small F number in a projection apparatus shown in FIG. 1.

FIG. 11 is a diagram showing a schematic configuration of a picture display device and a projection apparatus in accordance with the present invention that are different from the above.

FIGS. 12a and 12b are a diagram schematically showing a difference in effect between an incoming light ray reflected in a display area and an incoming light ray not reflected in the display area in the picture display device shown in FIG. 11.

FIG. 13 is a diagram showing a schematic configuration of another picture display device and another projection apparatus in accordance with the present invention that are different from the above.

FIG. 14 is a diagram showing a schematic configuration of still another picture display device and still another projection apparatus in accordance with the present invention that are different from the above.

FIG. 15 is a diagram showing a schematic configuration of yet another picture display device and yet another projection apparatus in accordance with the present invention that are different from the above.

FIG. 16 is a diagram showing a schematic configuration of a further picture display device and a further projection apparatus in accordance with the present invention that are different from the above.

FIG. 17 is a diagram showing a color separation filter employed in the picture display device shown in FIG. 16.

FIG. 18 is a diagram showing a schematic configuration of a further picture display device and a further projection apparatus in accordance with the present invention that are different from the above.

FIG. 19 is a diagram showing a schematic configuration of a further picture display device and a further projection apparatus in accordance with the present invention that are different from the above.

FIG. 20 is a diagram showing a schematic configuration of another picture display device and another projection apparatus in accordance with the present invention that are different.

FIG. 21 is a diagram showing an outline of a picture display device employing a conventional liquid crystal.

BEST MODE FOR CARRYING OUT THE INVENTION

The following will describe embodiments of the present invention with reference to the accompanying drawings. FIG. 1 shows a schematic configuration of a projection apparatus 6 in accordance with the present invention. The projection apparatus 6 of the embodiment is equipped with a picture display device 2 and a projection lens 8 that projects an outgoing light ray 74 emitted from the picture display device 2 onto a screen 9. The picture display device 2 of the embodiment is equipped with a light guiding member 10 provided with a total reflection surface 52 capable of transmitting an incoming light ray 70 for displaying images by means of total reflection, an optical switching assembly 20 attached to a display area 53a of the total reflection surface 52 of the light guiding member, and a light source assembly 60 disposed so as to enable irradiation of the incoming light ray 70 to the display area 53a.

The light source assembly 60 is equipped with a light source center 62 emitting white light of a white metal halide lamp or the like, and a color separation filter 66 rotated by a driving member 67 such as a motor. The white light emitted from the light source center 62 is time-shared into the primary colors by the color separation filter 66, then supplied as the incoming light ray 70 to the light guiding member 10. The light source assembly 60 is further provided with a collimeter lens 68 for turning the incoming light ray 70 into a parallel beam and guiding it to the light guiding member 10.

The light guiding member 10 that receives the incoming light ray 70 is a light guiding member formed of a material such as a glass or transparent plastic material that has a high transmittance of incoming light ray. The light guiding member 10 of this embodiment is shaped like a substantially trapezoid prism designed so that an incoming light ray entering an incident surface 56, which is a side surface of the light guiding member 10 and faces the light source assembly 60, is totally reflected in the light guiding member 10 by using the bottom surface 52 as a total reflection surface, and transmitted. The incoming light ray 70 reflected by the total reflection surface 52 is reflected by another side surface, which is provided so as to oppose the incident surface 56 with the total reflection surface 52 located between them, as a reflection surface 58, and applied back to the total reflection surface 52. Thus, an area of the total reflection surface 52 which is irradiated with the incoming light ray 70 from two directions, namely, from the incident surface 56 and the reflection surface 58, provides the display area 53a. The optical switching assembly 20 is installed to cover the display area 53a. The incoming light ray 70 extracted to display an image by the optical switching assembly 20 is reflected upward so as to turn into an outgoing light ray 74 which exits through an emergent surface 54 opposing in parallel to the total reflection surface 52.

As shown in FIG. 2, the optical switching assembly 20 is installed so that it is in close contact with the display area 53a of the total reflection surface 52 of the light guiding member 10, and extracts light (evanescent light) leaking out from the total reflection surface 52 to emit the extracted light to the light guiding member 10, which is located above, with sufficient intensity. The optical switching assembly 20 in this embodiment is two-dimensionally disposed with respect to the total reflection surface 52 of the light guiding member 10, and has micro prisms 34 which are two-dimensionally arranged, each of which constituting one pixel 5 of an image. A surface of the micro prism 34 that faces the total reflection surface 52 provides an extracting surface 22 for extracting evanescent waves. Furthermore, the optical switching assembly 20 has a layer structure formed of a prism layer 38 in which the micro prisms 34 are two-dimensionally disposed, driving members 40 for driving the individual micro prisms 34, and a layer of a silicon substrate 44 on which driving ICs for controlling the driving members 40 are mounted, which are deposited in above-mentioned order.

Furthermore, the picture display device 2 of this embodiment may also be recognized as a structure in which an optical switching device 1 making up a single pixel 5 is two-dimensionally disposed. Accordingly, the optical switching device 1 of the embodiment has a layer structure in which the light guiding member 10, the micro prism 34 wherein a surface thereof that faces the total reflection surface 52 of the light guiding member 10 serves as the extracting surface 22, the driving member 40 for driving the micro prism 34, and the silicon substrate 44 on which the driving IC for controlling the driving member 40 is mounted are deposited in the above-mentioned order.

FIG. 3 is an enlarged view of the optical switching device. The optical switching device 1 is a device provided with a micro prism 34 which opposes a light guiding member formed of a glass plate or the like that transmits light by total reflection and which is an emergent member equipped with a transparent or light-transmitting extracting surface. The extracting surface of the optical switching device 1 is brought close or into contact, by making use of electrostatic force or electrostrictive effect, to not more than a distance at which leaked evanescent light to be described in detail hereinafter can be extracted so as to take out evanescent light to perform switching. For this purpose, the surface of each of the micro prisms 34 that faces the total reflection surface 52 provides the flat extracting surface 22 that can be brought in substantially close contact with the surface 52. Furthermore, the individual micro prisms 34 are transparent, micro-sized prisms formed of a polymer or inorganic substance, and arranged at a predetermined pitch p so that the sides of prism units 34a which face the light guiding member 10 provide bottom surfaces thereof, the prism units 34a having isosceles-triangular sections. Thus, the incoming light ray 70 guided from the extracting surface 22 by the micro prism 34 is reflected in each prism unit 34a by a side surface 35 that has a different angle from that of the total reflection surface. All extracted light rays are turned into an outgoing light rays 74 that are substantially perpendicular to a total reflection surface 32 and have distribution of irradiation in a perpendicular direction from a surface of the light guiding member 10, then emitted upward in the drawing.

The driving member 40 that drives the micro prism 34 includes a spacer 42 that supports the micro prism 34 and has a substantially T-shaped section, a leaf spring 45 capable of pressing, via the spacer 42, the extracting surface 22 of the optical switching assembly 20 toward the light guiding member 10 at a first position where it comes in contact with the total reflection surface 52, and an electrode 46 that uses electrostatic force to move the extracting surface 22 to a second position away from the total reflection surface 52. In this embodiment, a spring member 41 composed of a boron-doped silicon thin film serves as a counterpart of the electrode 46 for controlling the position of the micro prism 34. When no drive voltage is supplied from a lower layer driving circuit 44 to the electrode 46, the extracting surface 22 is set at the first position where the extracting surface 22 of the micro prism 34 is brought into contact with or close to the total reflection surface 52 by the spring member 41 as illustrated in a pixel 5a at left in FIG. 3. At the first position, the incoming light ray 70 leaked out from the light guiding member 10 is extracted and reflected perpendicularly, thus setting an ON state wherein the outgoing light ray 74 exits from the emergent surface 54. Conversely, when power is supplied to the electrode 46, the extracting surface 22 moves to the second position as illustrated in a pixel 5b shown at right in FIG. 3. Hence, the incoming light ray 70 is not reflected by the micro prism 34, thus setting an OFF state wherein light (evanescent wave) is not emitted from the light guiding member 10.

In the picture display device 2 of the embodiment, the incoming light ray 70 is applied from two directions to the display area 53a of the total reflection surface 52 as mentioned above. Therefore, as illustrated in the pixel 5a at the left in FIG. 3, the outgoing light ray 74 exits from both prism surfaces 35 with an apex 33 located therebetween in the micro prism 34, making it possible to obtain the outgoing light ray 74 with a large quantity of light and high intensity. Moreover, a dark portion is no longer produced in the pixels in the ON state, enabling a boundary-free, seamless image to be obtained.

To be more specific, as illustrated in FIG. 4, when the incoming light ray 70 is applied from one direction to the display area 53a, the incoming light ray 70 is applied to only one prism surface 35 of the micro prism 34 even when the pixel 5 is in the ON state, and the outgoing light ray 74 does not exit from the other prism surface 35. Hence, dark portions 76 are inevitably generated in the single pixel 5, and the intensity of the outgoing light ray 74 decreases with consequent lower ON/OFF contrast. In addition, microscopically, the dark portions 76 are present in the pixel, so that discontinuous image display results. Thus, the picture display device 2 of the embodiment adapted to turn ON/OFF the evanescent light, which leaks out of the display area 53a, via the optical switching assembly 20 is able to produce images of higher contrast and higher quality by applying incoming light rays to the display area 53a from two directions as shown in FIG. 3.

Furthermore, the micro prisms 34 of the embodiment emit the evanescent light, which has been extracted by the extracting surface 22, at an angle substantially perpendicular to the total reflection surface 52 so as to provide high light intensity. This will be described in detail in conjunction with FIG. 5 providing an enlarged view of the incoming light ray 70 reflected by the micro prism 34 of this embodiment. The micro prism 34 of the embodiment has three micro prism units 34a that have triangle pole shapes extending in a direction perpendicular to the drawing, and are arranged at a pitch p. The incoming light ray 70 incident upon the total reflection surface 52 at an incident angle θ from the light guiding member 10 is extracted by the extracting surface 22 before it enters the micro prism unit 34a. In the micro prism unit 34a, the incoming light ray 70 strikes the side surface 35 of the prism unit 34a and reflects, then passes through the extracting surface 22 and the total reflection surface 52 to enter the light guiding member 10, and further passes through the emergent surface 54 of the light guiding member before it is released to the outside. The light ray (outgoing light ray) 74 reflected by the micro prism unit 34a has a different angle from that of the incoming light ray 70; hence, it is released to the outside without being reflected by the total reflection surface 52 or the emergent surface 54.

As set forth above, the optical switching device 1 of the embodiment sets the outgoing light ray 74 in a direction perpendicular to the total reflection surface 52 and the emergent surface 54 to arrange the direction of the outgoing light ray 74 so as to permit higher contrast. Moreover, emitting the outgoing light ray 74 in the perpendicular direction prevents itself from being refracted by the total reflection surface 52 and the emergent surface 54, thereby making it possible to obtain distortion-free images when the optical switching device 1 is used to constitute the picture display device 2. In order to set the outgoing light ray 74 in a direction perpendicular to the total reflection surface 52 and the emergent surface 54, the section of the micro prism 34 forms an isosceles triangle having an apex angle ψ, where an apex angle of an apex 33 formed by two side surfaces 35 of the micro prism unit 34a is denoted as ψ, and an angle formed by the side surface 35 and the extracting surface (bottom surface) 32 is denoted as φ. When the incoming light ray 70 is reflected by the side surface 35 of the micro prism perpendicularly to the total reflection surface 52, the incident angle θ is divided into two halves by a normal line 39 with respect to the side surface 35 of the micro prism as shown in FIG. 5; therefore, a relationship shown below is established between the incident angle θ and the bottom angle φ:

$$\phi = \theta/2 \quad (1)$$

Therefore, the apex angle ψ is expressed as follows:

$$\psi = 180 \text{ degrees} - 2\phi$$
$$= 180 \text{ degrees} - \theta \quad (2)$$

Thus, using the micro prism units 34a in which the apex angle ψ in relation to the incident angle θ satisfies the above expression (2) enables the outgoing light ray 74, which has been reflected by the reflecting surface 35 of the prism, to exit in a direction perpendicular to the extracting surface 22, the total reflection surface 52, and the emergent surface 54.

FIG. 6 shows some examples of transmittance of evanescent light. It has been known that bringing a transparent member close to a surface, where light is being reflected, causes evanescent light to leaks out to the transparent member and to be transmitted therethrough. Furthermore, the transmittance of evanescent light varies depending on the refractive index of a medium, an incident angle, etc. FIG. 6 shows a transmittance curve 14 of the transmittance (%) of evanescent light measured with respect to an interval (μm) between the total reflection surface 52 and the extracting surface (transparent member) 32 when the incident angle is set to 50 degrees in relation to a light ray having a wavelength λ of 500 nm. Furthermore, a characteristic curve 15 observed when the incident angle is set to 60 degrees, a characteristic curve 16 observed when the incident angle is set to 70 degrees, and a characteristic curve 17 observed when the incident angle is set to 80 degrees are also shown. As can be seen from the diagram, when the incident angle θ is 50 degrees, the transmittance does not reach a vicinity of 0% unless the distance between the total reflection surface 52 and the extracting surface 22 is set to 0.3 μm or more. This means that the moving distance of the prism 34 has to be increased, and a drive voltage applied to electrodes 46 and 47 of the driving member 40 increases accordingly. In addition, since the moving distance of the prism 34 increases, the operating speed of the optical switching device 1 drops accordingly. Thus, the incident angle θ is preferably set to 50 degrees or more and more preferably set to 60 degrees or more.

On the other hand, if the incident angle θ is 80 degrees, the transmittance decreases to approximately 10% when the distance between the total reflection surface 52 and the extracting surface 22 is increased to approximately 0.05 μm. Therefore, ON/OFF contrast cannot be obtained unless the surface accuracy of the total reflection surface 52 and the extracting surface 22 is extremely high. Furthermore, the driving member 40 must employ a highly reliable supporting mechanism because a small gap between the total reflection surface 52 and the extracting surface 22 in the ON state causes the intensity of an outgoing light ray to significantly drop. Hence, to conduct stable gray scale control, the incident angle θ is preferably set to 80 degrees or less and more preferably set to 70 degrees or less. Thus, considering the drive voltage, the surface accuracy, and the composition of the driving member, it is desirable that the incident angle θ is set to a range of about 60 to about 70 degrees in order to provide stable, high ON/OFF contrast at a reasonable cost.

Furthermore, it is most preferable to set the incident angle θ to 60 degrees. When the incident angle θ is 60 degrees, a light ray incident upon the prism unit 34a is parallel to the surface 35 of the prism. Hence, the incident light ray is evenly applied to the surface 35 of the prism in the direction that reflects the light ray in a perpendicular direction, permitting most efficient reflection in the perpendicular direction so as to provide the bright outgoing light ray 74. In contrast to this, if the incident angle θ exceeds 60 degrees, a part of the reflection surface 35 is in a shade of the opposing reflection surface, generating an area where no light ray exits. Furthermore, if the incident angle θ is smaller than 60 degrees, a part of the incident light ray strikes a surface on the opposite side from the surface 35 where it is reflected in the perpendicular direction, and is reflected in a direction other than the perpendicular direction.

In the micro prism 34 making up the optical switching assembly 20 or the optical switching device 1, it is most desirable to arrange so that, of the apexes of the micro prism unit 34a, an apex 36 located on the side of the extracting surface 22 that protrudes toward the light guiding member 10 rather than an apex 33 facing the bottom surface (extracting surface) 22 is positioned at an end 22a of the extracting surface 22 as shown in FIG. 5. When the apex 36 is disposed on the inner side away from the end 22a of the extracting surface 22 as shown in FIG. 7, a portion 35c of the reflection surface 35 of the prism unit 34a becomes a shade area to which a light ray entering the extracting surface 22 is not applied. As a result, the light ray is not emitted from an area 23 in the vicinity of the end 22a of the extracting surface 22, leading to a smaller area of a luminous flux emitted from the emergent surface 54 of the light guiding member 10. Furthermore, when the picture display device 2 is constituted using such a micro prism, the boundary between pixels becomes dark, preventing a seamless image from being attained. In contrast to this, in the case where the prism unit 34a is disposed so that the apex 36 is positioned at the end 22a of the extracting surface 22 as shown in FIG. 5, no portion is in a shade, and a light ray exits also from the end 22a of the extracting surface 22. This allows a bright optical switching device 1 to be provided and a picture display device 2 capable of forming seamless images to be provided also.

Moreover, it is most desirable that the apex 36 coincides with the extracting surface 22 in the optical switching device 1 of the embodiment as illustrated in FIG. 5. If the apex 36 is located at a position away from the extracting surface 22 as shown in FIG. 8, the incoming light ray 70 extracted from the light guiding member 10 in the vicinity of the end 22a of the extracting surface 22 is not reflected by the reflection surface 35 of the prism; the incoming light ray 70 turns into a transmitted light ray or a stray light ray 75 which is scattered to the outside from the micro prism 34, e.g., scattered to an adjacent micro prism, etc. This leads to lower efficiency of utilization of the incoming light ray 70 with a resultant reduction in the quantity of light. Furthermore, in the picture display device 2, the transmitted stray light ray 75 may affect an adjoining pixel, causing a cross talk or the like.

In contrast to the above, in the case of the micro prism 34 shown in FIG. 5, the apex 36 substantially coincides with the extracting surface 22; therefore, light does not leak at the end 22a of the extracting surface 22, permitting efficient utilization of the incoming light ray 70 for the outgoing light ray 74. It is also possible to prevent influences exerted on an adjoining optical switching device 1 or pixel.

Furthermore, in the picture display device 2 or the optical switching device 1 of the embodiment, it is preferable to set the pitch p of the micro prism units 34a to 3 μm or more, and it is more preferable to set it to 4 μm or more. FIG. 9 shows the pitch p of the micro prism units 34a and the angles of diffraction of the outgoing light ray 74 reflected by these micro prism units 34a. As can be seen from the diagram, when the wavelength λ is in a range of 400 nm to 700 nm of visible light, setting the pitch p of the micro prism units 34a at about 3 μm or more permits the angle of diffraction to be 10 degrees or less. Accordingly, substantially all the outgoing light ray 74 emitted from the picture display device 2 in a projection apparatus, which will be discussed hereinafter, can be captured into a projection lens. Further preferably, the pitch p of the micro prism units 34a is set to 4 μm or more, considering a manufacture tolerance or changes with the lapse of time, etc. of the micro prism units 34a.

Considering the size of the pixel 5 constituting the picture display device 2, the size of the extracting surface 22 should be about 15 μm or less. Therefore, the pitch p of the micro prism units 34a is limited to about 15 μm at the maximum. As the pitch p of the micro prism units 34a increases, the reflection surface 35 widens and the distance between the apexes 33 and 36 of the prism units 34a increases, adding to the thickness thereof. This inevitably leads to an increase in the size of the micro prism 34. For this reason, the pitch p of the micro prism units 34a is preferably smaller in order to form the optical switching assembly 20 to be thin and compact. These results lead to a conclusion that a pitch p that accommodates two peaks in a width of 15 µm, that is, the pitch p of 7.5 µm, and the pitch p of 5 µm that accommodates three peaks are both preferable. Thus, using the micro prism 34 as shown in FIG. 5 makes it possible to provide an optical switching device 1 and the picture display device 2 that permit high efficiency of utilization of light, feature a high ON/OFF contrast, and operate at high speed.

Moreover, the projection apparatus 6 of the embodiment that projects the outgoing light ray 74 emitted from the foregoing picture display device 2 onto the screen 9 employs the projection lens 8 of a small F number. As schematically shown in FIG. 10, a light source 62 making up the light source assembly 60 is actually a light source that has a certain size rather than a point light source. Hence, the incoming light ray 70 emitted from the light source assembly 60 cannot be turned into a precise parallel beam even if it is passes through the collimeter lens 68; it is turned into a light flux that somewhat spreads. Accordingly, the outgoing light ray 74 exiting from the emergent surface 54 of the picture display device 2 is also turned into a light flux that somewhat spreads. In order to project an image that is as bright as possible onto the screen 9, it is desired that the outgoing light ray 74 reflected by the micro prism 34 be converged by the projection lens 8 up to about a first-order diffracted light ray. Therefore, the projection lens 8 employs a lens or a lens system capable of converging not only parallel beams emitted from the emergent surface 54 but also light rays that somewhat diverges. Using a lens or lens system having a small F number permits a distance 13 between the projection lens 8 and the emergent surface 54 of the light guiding member 10 to be reduced. Thus, by using the projection lens 8 of a small F number, the projection apparatus 6 that is small and able to display brighter images can be provided.

As set forth above, the optical switching device 1 and the picture display device 2 of the embodiment making use of evanescent waves arrange an evanescent wave, which has been extracted using the micro prism 34, in the perpendicular direction with respect to the total reflection surface 52 before emitting the evanescent wave, thereby to permit display of images with a high contrast ratio. Moreover, the configuration of the micro prism 34 has been optimized, and the incoming light ray 70 is applied to the micro prism 34 from two symmetric directions so as to enable display of bright, seamless images with minimized light and shade. The following will describe several different embodiments of configurations in which the incoming light ray 70 is applied to the optical switching assembly 20 of the picture display device 2 from two directions.

In the picture display device 2 shown in FIG. 11, a half 70b of the incoming light ray 70 which has entered the incident surface 56 of the light guiding member 10 is applied also to a non-display area 53b which is different from the display area 53a of the total reflection surface 52 and which is not in contact with the optical switching assembly 20. The incoming light ray 70b totally reflected by the non-display area 53b is totally reflected by an upper surface, namely, a part 54a of the emergent surface 54, then reflected by the reflection surface 58. The incoming light ray 70b can be applied to the display area 53a from an opposite side with respect to a remaining incoming light ray 70a that has entered through the incident surface 56. Therefore, the reflection surface 58 of this embodiment is set at a different angle from that of the reflection surface of the light guiding member 10 shown in FIG. 1 so that it is able to apply the incoming light ray 70b reflected by the part 54a of the emergent surface to the display area 53a from the opposite side. Furthermore, the surface of the reflection surface 58 is provided with a reflection film formed by vapor deposition. Thus, by reflecting the incoming light ray 70b at the area 53b, which is not the display area 53a, of the total reflection surface 52 so as to irradiate the display area 53a with the incoming light rays 70a and 70b from the two directions, such problems as contrast becoming uneven depending upon a display portion or display contents, or dark display can be prevented.

The advantages of the picture display device 2 shown in FIG. 11 will be further described by using a schematic picture display device 2 shown in FIGS. 12(a) and (b). FIG. 12(a) illustrates an example wherein only a part of the display area 53a is irradiated due to a reason such as a small sectional area 77 of the incoming light ray 70 entered through the incident surface. In the picture display device in accordance with the present invention, even such an incoming light ray is reflected in the light guiding member 10 by the total reflection surface 52 and an irradiating surface 54 and transmitted, so that the entire display area 53a can be irradiated with the incoming light ray that has been totally reflected. If, however, a given pixel 5a of the display area 53a to which the incoming light ray 70 is to be applied first has been ON, then the incoming light ray 70 applied to the display area 53a will be extracted by the micro prism 34 and turned into an irradiating light ray 74, then released from the light guiding member 10. As a result, there will be no incoming light ray that is totally reflected in the light guiding member 10 and transmitted, or the incoming light ray will be extremely weak. Therefore, in a pixel 5c to which the incoming light ray 70, which has been reflected in the area of the pixel 5a, is expected to be applied, even when the micro prism 34 turns ON/OFF, there will be no light ray to be extracted by the micro prism 34, and no outgoing light ray will be emitted. Conversely, if the pixel 5a is OFF, then the incoming light ray is applied to the pixel 5c, so that the outgoing light ray will be emitted as the pixel 5c turns ON/OFF.

Thus, an attempt to irradiate the entire display area 53a by the incoming light ray 70 reflected by a part of the display area 53a makes it impossible to perform pixel ON/OFF display at some locations of the display area 53a or causes an extremely weak contrast although the display may be performed. The positions of pixels presenting such a problem are influenced also by images. Hence, uniform brightness of images cannot be attained even if corrective measures such as reducing the reflection area of the micro prism in the area, to which the incoming light ray 70 is applied first, are taken.

In contrast to the above, if the area of the luminous flux of the incoming light ray 70 is increased so as to directly irradiate the entire display area 53a by the incoming light ray 70 entering the incident surface as illustrated in FIG. 12(b), that is, if the incoming light ray not reflected by the display area 53a is used for the irradiation, then the outgoing light ray 74 exits from the light guiding member 10 according to the ON/OFF operation of the pixel 5c without being affected by the ON/OFF of other pixel 5a or 5b, etc. Therefore, in the picture display device 2 shown in FIG. 1, the entire display area 53a is directly irradiated with the incoming light ray 70 entered from the incident surface 56. This makes it possible to display good-quality images free of such problems as contrast varying depending on images or locations in an image display area, or unclear display of images.

The same applies, however, to the other incoming light ray 70 of the incoming light rays 70 that irradiate the display area 53a from the two directions since the other incoming light ray 70 irradiates the display area 53a after it is reflected by the reflection surface 58 of the light guiding member 10. More specifically, if a light ray that has been totally reflected in the display area 53a is reflected by the reflection surface 58 and applied back to the display area 53a, then a portion wherein a pixel is turned ON and the incoming light ray 70 is extracted and emitted will not be able to obtain an incoming light ray that is to be reflected by the reflection surface 58 and applied back to the display area 53a. Consequently, the contrast of pixels may vary, depending on the type of images displayed or the locations of display, although it may not be as bad as the picture display device shown in FIG. 12(a). In contrast to this, in the case of the picture display device 2 shown in FIG. 11, the incoming light ray 70b that has been reflected in the non-display area 53b is reflected by the reflection surface 58 and applied to the display area 53a, in addition to the incoming light ray 70a directly applied to the display area 53a. This prevents the incoming light rays 70a and 70b, which are applied to the display area 53a from the two directions, from being affected by the ON/OFF of the pixels. Thus, homogeneous high-quality images with high contrast as a whole can be displayed.

The case of the picture display device 2 shown in FIG. 13 is also adapted to directly apply the half 70a of the incoming light ray 70 entered from the incident surface 56 to the display area 53a. The other half incoming light ray 70b is reflected by the non-display area 53b, then applied to the display area 53a from a direction symmetric to that of the incoming light ray 70a. Furthermore, in the light guiding member 10 of the embodiment, a second reflection surface 59 for the incoming light ray 70b, which has been reflected by the non-display area 53b, to strike and reflect to the reflection surface 58 is set at a different angle from that of the emergent surface 54. The second reflection surface 59 is arranged so that the incoming light ray 70b is totally reflected by the second reflection surface 59 and the reflection surface 58, then guided to the display area 53a at an appropriate angle. Hence, there is no need to form reflection films on the two reflection surfaces 58 and 59 by vapor deposition. In the picture display device 2 of this embodiment, the light guiding member 10 is provided with the second reflection surface 59 and formed in a pentagonal prism, permitting the picture display device 2 to be provided at lower cost by a simplified manufacturing process of the light guiding member 10. Thus, the shape of the light guiding member 10 employed with the picture display device in accordance with the present invention is not limited to any particular shape such as trapezoid; the shape of the light guiding member may be decided to provide a proper optical path by, for example, adding a reflection surface at an appropriate angle.

FIG. 14 shows another example of the picture display device different from those described above. In the picture display device 2 of this embodiment, the half 70a of the incoming light ray 70 entering from the incident surface 56 is directly applied to the display area 53a, and the other half incoming light ray 70b is reflected by the non-display area 53b, then applied to the display area 53a from a direction symmetric to the direction of the incoming light ray 70a. In this embodiment, the incoming light ray 70b reflected by the non-display area 53b is reflected by a part 54a of an emergent surface, then reflected by the second reflection surface 59, and further reflected by the reflection surface 58 before it is finally applied to the display area 53a. Therefore, when attention is focused on a light ray 71a closer to the center of the incoming light ray 70a and a light ray 71b closer to the center of the incoming light ray 70b, the light ray 71a closer to the center of the incoming light ray 70a strikes the left end of the display area 53a, while the light ray 71b closer to the center of the reflected incoming light ray 70b strikes the right end of the display area 53a.

In the light source assembly 60 equipped with the single light source center 62, the light intensity of a light ray from the light source center 62 is the highest, and it gradually weakens toward a periphery. To employ a light source with distribution of high intensity, therefore, it is necessary to install a special optical system such as an integrator to level the light intensity of the incoming light ray 70 that irradiates the display area 53a. To obviate such a need, in the picture display device 2 of the present embodiment, the incoming light ray 70 is split into two halves substantially at the center thereof, and one of the half incoming light ray 70a is directly applied to the display area 53a. At the same time, the other half incoming light ray 70b is applied to the display area 53a so that it is symmetrically distributed, with a luminous flux in the vicinity of the center at which the intensity is the highest being in a different direction from that of the incoming light ray 70a. In other words, the incoming light ray 70b is applied so that the distribution of light quantity in the display area 53a is reversed from that of the incoming light ray 70a. Thus, since the entire display area 53a is irradiated by the two incoming light rays 70a and 70b, the distribution of the light quantity can substantially be leveled, making it possible to provide the picture display device 2 capable of performing uniformly bright display on an entire screen. Moreover, since the need for a special optical system or optical device such as an integrator can be obviated, it is possible to provide, at lower cost, the picture display device 2 and the projection apparatus 6 with simpler configurations.

The paths of the light guiding member for reversing the light intensity distribution of the incoming light rays are not limited to those of the light guiding member 10 of the embodiment. It is obvious that a prism member having a different shape from those mentioned above can be used for the light guiding member 10 by providing a plurality of reflection surfaces at appropriate angles.

FIG. 15 shows further examples of the picture display device 2 and the projection apparatus 6 that are different from those set forth above. The picture display device 2 of this example has two sets of light source assemblies 60a and 60b disposed one on each side for the display area 53a of the light guiding member 10. The incoming light rays 70a and 70b emitted from the light source assemblies 60a and 60b, respectively, enter through incident surfaces 56a and 56b, respectively, of the light guiding member 10, and turn into the incoming light ray 70 that irradiates the display area 53a from two directions. Thus, the incoming light ray 70 is applied to the display area 53a from the two directions also in the picture display device 2 of this example; hence, bright, seamless images with high contrast can be displayed as in the case of the picture display devices set forth above.

Furthermore, the picture display device 2 of this embodiment is provided with the two light source assemblies 60a and 60b, so that a power load (capacity) on one light source assembly can be reduced. For example, in the picture display device shown above, if a light source assembly of 200W is used, then the capacities of the light source assemblies 60a and 60b can be reduced to about 100W since the picture display device 2 of the embodiment has the two light source assemblies 60a and 60b. In this way, since the capacity of each light source assembly can be reduced by increasing the number of the light source assemblies, the quantity of heat generated by the light source assemblies decreases, thus obviating the need for a device for cooling light sources. This means that the configurations of the picture display device 2 and the projection apparatus 6 can be simplified. Furthermore, when a total capacity (power load) remains the same, an incoming light ray of light intensity that is greater than a half can be obtained from each of a plurality of split light source assemblies even if their capacity is reduced to a half. Thus, a picture display device and a projection apparatus that are able to display still brighter images can be provided. Hence, it is possible to achieve the picture display device 2 or the projection apparatus 6 which feature lower power consumption, are suitably used for a household television, an outdoor picture display device, etc., and display clear images even in a bright environment under natural light.

FIG. 16 shows examples of the picture display device 2 and the projection apparatus 6 different from those set forth above. In the picture display device 2 of this embodiment, two sets of light source assemblies 60a and 60b for the display area 53a of the light guiding member 10 are disposed on one side. The incoming light ray 70a emitted from one light source assembly 60a passes through the incident surface 56 and is directly applied to the display area 53a, while the incoming light ray 70b emitted from the other light source assembly 60b is reflected by the non-display area 53b of the total reflection surface 52, a part 54a of the emergent surface 54, and the reflection surface 58 before it is applied to the display area 53a from an opposite side from the incoming light ray 70a. Thus, as in the case of the picture display device that has been described in conjunction with FIG. 15, the picture display device 2 of this embodiment also enables obviation of a need for a cooling device for the light source assembly since it has the plurality of light source assemblies 60a and 60b. In addition, the picture display device 2 is capable of displaying brighter images.

Furthermore, the picture display device 2 of this embodiment is equipped with a rotating discoid color separation filter 66 that extends to light spots 69a and 69b of the light source assemblies 60a and 60b, respectively, in order to generate incoming light rays 70a and 70b that allow a white light ray emitted from the light source assemblies 60a and 60b to be time-shared into the primary colors for color display. The color separation filter 66, a front view of which is shown in FIG. 17, is divided into six fan-shaped sectors 66b arranged around a rotational center 66a in the circumferential direction. The six sectors 66b are arranged so that red, green, and blue (R, G, and B) filters are disposed to be point-symmetric with respect to the rotational center 66a. Furthermore, the spots 69a and 69b of the respective light sources 60a and 60b are also disposed to be point-symmetric with respect to the rotational center 66a of the color separation filter 66. Hence, when the color separation filter 66 turns around the rotational center 66a, incoming light rays 70a and 70b of the same color are applied to the incident surface 56 of the light guiding member 10 from the respective light sources 60a and 60b. Thus, color synchronization of the incoming light rays 70a and 70b emitted from the respective light source assemblies 60a and 60b can be accomplished simply by rotating the color separation filter 66 which is disposed to be shared by the light source assemblies 60a and 60b and has the configuration set forth above. Needless to say, the color separation filter may have the primary colors of cyan, magenta, and yellow in place of red, green, and blue.

FIG. 18 shows the picture display device 2 and the projection apparatus 6 that are different from those set forth above. The picture display device 2 of this embodiment is adapted so that the incoming light ray 70 emitted from the light source assembly 60 passes through the incident surface 56, and is reflected by a part 54b of the emergent surface 54 that opposes the total reflection surface 52, then applied to the display area 53a of the total reflection surface 52. In the light guiding member 10, a light ray reflected at the display area 53a is reflected by the reflection surface 58, and irradiates the display area 53a from the opposite side. Obviously, as in the case of the several picture display devices described above, it is alternatively possible to apply the incoming light ray 70, which has been reflected by the part 54b of the emergent surface 54, to the non-display area 53b in addition to the display area 53a, and to apply the incoming light ray reflected at the non-display area 53b to the display area 53a by the reflection surface 58 from the opposite side.

In the picture display device 2 of this embodiment, the incoming light ray 70 is applied to the emergent surface 54 that opposes the total reflection surface 52 to irradiate the display area 53a by a light ray reflected by the part 54b. Thus, the incident direction of the incoming light ray is toward the total reflection surface 52 (from top to bottom in the drawings) in the picture display devices set forth above, whereas the incoming light ray 70 can be entered in the opposite direction, i.e. toward the emergent surface 54, or from bottom to top in the drawings in the picture display device 2 of this embodiment. This obviates the need for installing the light source assembly 60 together with the projection lens 8 above the light guiding member 10, and the light source assembly 60 can be disposed below the light guiding member 10, on the opposite side from the projection lens 8. This makes it possible to dispose the projection lens 8 and the light source assembly 60, which will require a large space among the elements constituting the projection apparatus 1, so that they do not interfere with each other, thus permitting a compact small projection apparatus 6 to be provided.

FIG. 19 shows a picture display device and a projection apparatus in accordance with the present invention that are different from those described above. In the several examples of the picture display device set forth above, the light source assembly 60 is disposed so that the incoming light ray 70 is perpendicularly incident upon the incident surface 56 of the light guiding member 10. In the picture display device 2 of this embodiment, however, the light source assembly 60 is disposed so that the incoming light ray 70 is refracted at the incident surface 56 before it enters the light guiding member 10. Thus, in the picture display device in accordance with the present invention, it is possible to employ an optical system whereby the incoming light ray 70 is refracted at the incident surface 56 when it enters. Using such an optical system makes it possible to prevent interference between the light source assembly 60 and the projection lens 8 when disposing them as in the cases of the picture display devices described above.

Furthermore, by refracting the incoming light ray 70 at the incident surface 56, the area 77b of the luminous flux of the incoming light ray irradiating the display area 53a in the light guiding member 10 can be changed in relation to an area 77a of the luminous flux supplied from the light source assembly 60 to the incident surface 56. Therefore, it becomes possible to apply a luminous flux of a small area from the light source assembly 60 to the incident surface 56 and spread the area of the luminous flux at the incident surface 56 to such an extent to cover the display area 53a.

FIG. 20 shows a picture display device and a projection apparatus different from those set forth above. In the picture display device 2 of this embodiment, the incoming light ray 70 from the light source assembly 60 is refracted through an incident prism 80 to change the angle of the incoming light ray 70, then enters the light guiding member 10 perpendicularly with respect to the incident surface 56. As in this embodiment, an adjustment for preventing the light source assembly 60 and the projection lens 8 from interfering with each other when disposing them can be accomplished by installing the incident prism 80 between the light source assembly 60 and the light guiding member 10 so as to refract the incoming light ray 70 by the incident prism 80 in place of changing the direction of the incoming light ray 70 at the incident surface 56 of the light guiding member 10. In addition, as in the case described above, a luminous flux suited for the light source assembly 60 or the display area 53a can be obtained by changing the areas 77a and 77b of the luminous flux of the incoming light ray 70 before or after the refraction.

As set forth above, according to the present invention, in a picture display device wherein an incoming light ray is totally reflected and transmissible evanescent light leaking out of the total reflection surface of the light guiding member is extracted using a micro prism to display images, the incoming light ray is applied from two directions. This makes it possible to apply an incoming light ray to apply to all surfaces of a micro prism constituting one pixel in a picture display device which can be operated at high speed and which controls evanescent light for obtaining a high contrast ratio. Thus, a picture display device can be provided which features a still higher ON/OFF contrast ratio and is able to display seamless images with no boundaries in a pixel or between pixels. A projection apparatus that projects a light ray emitted from the picture display device onto a screen through a projection lens is able to project a bright image with a high contrast onto a screen, making it possible to provide a projection apparatus capable of performing display even under natural light or of displaying images of quality that is high enough to survive enlarged display.

Moreover, in the picture display device using a micro prism in accordance with the present invention or the optical switching device using a micro prism, several conditions including an apex angle of the micro prism are optimized. A picture display device and an optical switching device, which provide higher efficiency of utilization of light, permit stable gray scale control, and is capable of displaying bright clear images, are provided. Furthermore, a quick operation at a lower drive voltage and lower power consumption is attained by optimizing micro prisms.

The present invention discloses several different embodiments as set forth above, and also discloses in detail a technology whereby bright, homogeneous images are obtained by applying light to a display area from two directions. Hence, the invention contained in the present specification makes it possible to provide a picture display device utilizing evanescent light (evanescent wave) that actually permits high brightness and contrast and quick operation, and to further provide a compact, high-performance projection apparatus that can be supplied at lower cost by employing the foregoing picture display device.

Industrial Applicability

The picture display device in accordance with the present invention can be applied to a variety of display equipment including a flat type display and a head-mounted display, in addition to the projection apparatus set forth above. Likewise, the application of the optical switching device in accordance with the present invention is not limited to picture display devices; the optical switching device in accordance with the invention finds an extremely extensive applications including line type light valve of an optical printer and an optical space modulator for a three-dimensional hologram memory. The optical switching device according to the invention is especially suited not only for the application fields wherein conventional optical switching devices employing liquid crystals are applied but also for fields and application equipment wherein the operating speed or the intensity of light provided by optical switching devices employing liquid crystals is not satisfactory. In addition, the optical switching device according to the invention can be micromachined, so that it can be made smaller and thinner than the conventional liquid crystal optical switching devices, thus permitting higher integration.

What is claimed is:

1. A picture display device comprising:
    a light guiding member equipped with a total reflection surface capable of transmitting an incoming light ray for image display by means of total reflection;
    an optical switching assembly mounted on a display area of said total reflection surface; and
    a light source assembly capable of applying said incoming light ray at least to said display area;
    wherein said optical switching assembly comprises a plurality of light transmitting extracting surfaces that can be moved to a first position for an approach to an extraction distance or less at which an evanescent wave leaking out of said display area can be extracted, and a second position for moving away to said extraction distance or more, and
    a plurality of micro prisms for reflecting light, which has been extracted by said extracting surfaces, toward said light guiding member; and
    said light source assembly or said light guiding member is configured so that said incoming light ray is applied to said display area from two symmetric directions.

2. A picture display device according to claim 1, wherein said light source assembly or said light guiding member is configured so that said entire display area is irradiated by said incoming light ray that has not been reflected by said display area.

3. A picture display device according to claim 1, wherein said light source assembly is equipped with at least one light source center disposed on one side of said total reflection surface; and
    said light guiding member comprises an emergent surface opposing said total reflection surface, an incident surface facing said light source assembly, and a reflection surface which opposes said incident surface with said total reflection surface located therebetween and which is capable of applying said incoming light ray, which has been reflected by said total reflection surface, toward said display area from symmetric directions.

4. A picture display device according to claim 3, wherein said reflection surface is capable of reflecting said incoming light ray, which has been reflected at an area other than said display area of said total reflection surface, toward said display area.

5. A picture display device according to claim 4, wherein said light source assembly comprises one light source center, an incoming luminous flux emitted from said light source center is split into two halves substantially at the center thereof, and one incoming luminous flux is reflected by an area other than said display area of said total reflection surface and further applied to said display area in a state where distribution of light quantity has been reversed with respect to the other incoming luminous flux by said reflection surface.

6. A picture display device according to claim 3, wherein said light source assembly comprises a rotary type color separation filter capable of color-separating an incoming light ray emitted from said light source center and applying said incoming light ray to said display area.

7. A picture display device according to claim 6, wherein;
said light source assembly comprises two light source centers disposed symmetrically with respect to a rotational center of said separation filter; and
said color separation filter has filters of the same color disposed point-symmetrically in areas divided around said rotational center.

8. A picture display device according to claim 1, wherein;
said light source assembly comprises two said light source assemblies; and
said light guiding member comprises an emergent surface opposing said total reflection surface, and first and second incident surfaces which face said respective light source assemblies and are capable of applying said incoming light ray to said display area from two symmetric directions.

9. A picture display device according to claim 1, wherein;
said light guiding member comprises an emergent surface opposing said total reflection surface, and an incident surface which faces said light source assembly and is capable of introducing said incoming light ray into said light guiding member; and
said light source assembly and said incident surface are disposed so that said incoming light ray entering through said incident surface is totally reflected by said emergent surface, then applied to said display area.

10. A picture display device according to claim 1, wherein;
said light guiding member comprises an emergent surface opposing said total reflection surface, and an incident surface which faces said light source assembly and is capable of introducing said incoming light ray into said light guiding member; and
said light source assembly is disposed so that said incoming light ray is refracted at said incident surface before being applied to said display area.

11. A picture display device according to claim 1, wherein;
said light guiding member comprises an emergent surface opposing said total reflection surface, and an incident surface which faces said light source assembly and is capable of introducing said incoming light ray into said light guiding member; and
said light source assembly comprises an incident prism that changes an angle of said incoming light ray emitted from said light source assembly, and guides said incoming light ray to said incident surface.

12. A picture display device according to claim 1, wherein an apex angle $\psi$ of said micro prism in relation to an incident angle $\theta$ of said incoming light ray with respect to said total reflection surface satisfies the following expression:

$$\psi = 180 \text{ degrees} - \theta$$

13. A picture display device according to claim 12, wherein said incident angle $\theta$ ranges from about 60 degrees to 70 degrees.

14. A picture display device according to claim 12, wherein said incident angle $\theta$ is 60 degrees.

15. A picture display device according to claim 12, wherein an apex of said micro prism that protrudes toward said light guiding member is positioned at an end of said extracting surface.

16. A picture display device according to claim 15, wherein said apex is positioned in the vicinity of said extracting surface.

17. A picture display device according to claim 12, wherein a pitch of said micro prism is approximately 3 $\mu$m or more.

18. A picture display device according to claim 12, wherein a pitch of said micro prism is approximately 4 $\mu$m or more.

19. An optical switching device comprising:
a light guiding member equipped with a total reflection surface capable of totally reflecting an incoming light ray;
a light transmitting extracting surface that can be moved to a first position for an approach to said total reflection surface at an extraction distance or less at which an evanescent wave leaks out, and a second position for moving away at said extraction distance or more, and
a micro prism that reflects light, which has been extracted by said extracting surface, toward said light guiding member; and an apex angle $\psi$ of said micro prism in relation to an incident angle $\theta$ of said incoming light ray with respect to said total reflection surface satisfies the following expression:

$$\psi = 180 \text{ degrees} - \theta$$

20. A projection apparatus according to claim 19, wherein an F number of said projection lens is small.

21. An optical switching device comprising:
a light guiding member equipped with a total reflection surface capable of totally reflecting an incoming light ray;
a light transmitting extracting surface that can be moved to a first position for an approach to said total reflection surface at an extraction distance or less at which an evanescent wave leaks out, and a second position for moving away at said extraction distance or more, and
a micro prism that reflects light, which has been extracted by said extracting surface, toward said light guiding member; and apex angle $\psi$ of said micro prism in relation to an incident angle $\theta$ of said incoming light ray with respect to said total reflection surface satisfies the following expression:

$$\psi = 180 \text{ degrees} - \theta \quad (A).$$

22. An optical switching device according to claim 21, wherein said incident angle $\theta$ ranges from about 60 degrees to 70 degrees.

23. An optical switching device according to claim 21, wherein said incident angle $\theta$ is 60 degrees.

24. An optical switching device according to claim 21, wherein an apex of said micro prism that protrudes toward said light guiding member is positioned at an end of said extracting surface.

25. An optical switching device according to claim 21, wherein said apex is positioned in the vicinity of said extracting surface.

26. A picture display device comprising a plurality of optical switching devices, each said optical switching device comprising:
- a light guiding member equipped with a total reflection surface capable of totally reflecting an incoming light ray;
- a light transmitting extracting surface that can be moved to a first position for an approach to said total reflection surface at an extraction distance or less at which an evanescent wave leaks out, and a second position for moving away at said extraction distance or more, and
- a micro prism that reflects light, which has been extracted by said extracting surface, toward said light guiding member; and an apex angle ψ of said micro prism in relation to an incident angle θ of said incoming light ray with respect to said total reflection surface satisfies the following expression:

ψ=180 degrees−θ and wherein said optical switching devices are two-dimensionally arranged, and said incoming light ray of white or the primary colors is applied to said light guiding member at an incident angle θ from two symmetric directions.

27. A projection apparatus comprising:
  a picture display device comprising:
  - a light guiding member equipped with a total reflection surface capable of transmitting an incoming light ray for image display by means of total reflection;
  - an optical switching assembly mounted on a display area of said total reflection surface; and
  - a light source assembly capable of applying said incoming light ray at least to said display area;
  - wherein said optical switching assembly comprises a plurality of light transmitting extracting surfaces that can be moved to a first position for an approach to an extraction distance or less at which an evanescent wave leaking out of said display area can be extracted, and a second position for moving away to said extraction distance or more, and
  - a plurality of micro prisms for reflecting light, which has been extracted by said extracting surfaces, toward said light guiding member; and
  - said light source assembly or said light guiding member is configured so that said incoming light ray is applied to said display area from two symmetric directions; and
  - a projection lens capable of projecting said outgoing light ray emitted from said picture display device onto a screen.

28. A picture display device comprising a plurality of optical switching devices described in claim 21, wherein said optical switching devices are two-dimensionally arranged, and said incoming light ray of white or the primary colors is applied to said light guiding member at an incident angle θ from two symmetric directions.

29. A projection apparatus comprising:
  a picture display device comprising a plurality of optical switching devices, each said optical switching device comprising:
  - a light guiding member equipped with a total reflection surface capable of totally reflecting an incoming light ray;
  - a light transmitting extracting surface that can be moved to a first position for an approach to said total reflection surface at an extraction distance or less at which an evanescent wave leaks out, and a second position for moving away at said extraction distance or more, and
  - a micro prism that reflects light, which has been extracted by said extracting surface, toward said light guiding member; and an apex angle ψ of said micro prism in relation to an incident angle θ of said incoming light ray with respect to said total reflection surface satisfies the following expression:

ψ=180 degrees−θ; and wherein said optical switching devices are two-dimensionally arranged, and said incoming light ray of white or the primary colors is applied to said light guiding member at an incident angle θ from two symmetric directions; and
  a projection lens capable of projecting said outgoing light ray emitted from said picture display device onto a screen.

30. A projection apparatus according to claim 29, wherein an F number of said projection lens is small.

* * * * *

UNITED STATES PATENT AND TRADEMARK OFFICE
CERTIFICATE OF CORRECTION

PATENT NO. : 6,198,566 B1
DATED : March 6, 2001
INVENTOR(S) : Takashi Takeda et al.

It is certified that error appears in the above-identified patent and that said Letters Patent is hereby corrected as shown below:

<u>Title page, Item [54] and Column 1, line 1,</u>
Title, insert -- DEVICE -- after "DISPLAY".

<u>Column 20,</u>
Lines 25, and 43-60, change "19" to -- 27 --.

<u>Column 22,</u>
Lines 61, 64 and 66, change "21" to -- 19 --.

<u>Column 23,</u>
Line 3, change "21" to -- 19 --.

<u>Column 24,</u>
Lines 10-15, cancel Claim 28.
Line 46, add the following claims:

-- 31. An optical switching device according to Claim 19, wherein a pitch of said micro prism is approximately 3 $\mu$m or more. --

-- 32. An optical switching device according to Claim 19, wherein a pitch of said micro prism is approximately 4 $\mu$m or more. --

Signed and Sealed this

Twenty-ninth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,198,566 B1
DATED          : March 6, 2001
INVENTOR(S)    : Takashi Takeda et al.

It is certified that error appears in the above-identified patent and that said Letters Patent is hereby corrected as shown below:

<u>Title page, Item [54] and Column 1, line 1,</u>
Title, insert -- DEVICE -- after "DISPLAY".

<u>Column 22,</u>
Line 41, change "19" to -- 27 --.
Lines 43-60, cancel Claim 21.
Lines 61, 64 and 66, change "21" to -- 19 --.

<u>Column 23,</u>
Line 3, change "21" to -- 19 --.

<u>Column 24,</u>
Lines 10-15, cancel Claim 28.
Line 46, add the following claims:

-- 31. An optical switching device according to Claim 19, wherein a pitch of said micro prism is approximately 3 $\mu$m or more. --

-- 32. An optical switching device according to Claim 19, wherein a pitch of said micro prism is approximately 4 $\mu$m or more. --

This certificate supersedes Certificate of Correction issued July 29, 2003.

Signed and Sealed this

Thirtieth Day of December, 2003

JAMES E. ROGAN
*Director of the United States Patent and Trademark Office*